US012612038B2

(12) United States Patent
Harada et al.

(10) Patent No.: US 12,612,038 B2
(45) Date of Patent: Apr. 28, 2026

(54) VEHICLE DRIVE ASSIST APPARATUS

(71) Applicant: SUBARU CORPORATION, Tokyo (JP)

(72) Inventors: Reo Harada, Tokyo (JP); Seiya Sato, Tokyo (JP); Hiroaki Kuramochi, Tokyo (JP); Hiroki Maniwa, Tokyo (JP); Wataru Munemura, Tokyo (JP); Shigeki Mukai, Tokyo (JP); Kazuyuki Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 182 days.

(21) Appl. No.: 18/238,654

(22) Filed: Aug. 28, 2023

(65) Prior Publication Data

US 2024/0083423 A1 Mar. 14, 2024

(30) Foreign Application Priority Data

Sep. 7, 2022 (JP) ................................. 2022-142520

(51) Int. Cl.
*B60W 30/095* (2012.01)
*G06V 10/60* (2022.01)
*G06V 20/58* (2022.01)

(52) U.S. Cl.
CPC ......... *B60W 30/0956* (2013.01); *G06V 10/60* (2022.01); *G06V 20/58* (2022.01); *B60W 2554/80* (2020.02)

(58) Field of Classification Search
CPC ......... B60W 30/0956; B60W 2554/80; B60W 40/02; B60W 30/02; B60W 30/09; B60W 2554/20; G06V 10/60; G06V 20/58; G06V 20/588
See application file for complete search history.

(56) References Cited

U.S. PATENT DOCUMENTS

| | | | | |
|---|---|---|---|---|
| 8,224,564 B2 * | 7/2012 | Ogasawara | ............ | G08G 1/167 701/301 |
| 8,705,796 B2 * | 4/2014 | Ogata | .................... | G06V 10/50 382/103 |
| 11,030,761 B2 * | 6/2021 | Yamada | .................. | G06T 7/593 |
| 11,577,748 B1 * | 2/2023 | Wang | .................. | B60W 60/001 |
| 11,790,664 B2 * | 10/2023 | Musk | .................. | G06V 10/803 382/103 |
| 12,043,283 B2 * | 7/2024 | Wang | .................. | G06V 20/588 |

(Continued)

FOREIGN PATENT DOCUMENTS

| | | | | | |
|---|---|---|---|---|---|
| JP | 2015197823 A | * | 11/2015 | | |
| JP | 2019-67018 A | | 4/2019 | | |
| WO | WO-2012076036 A1 | * | 6/2012 | ........... | G06V 20/582 |

*Primary Examiner* — Peter D Nolan
*Assistant Examiner* — Demetra R Smith-Stewart
(74) *Attorney, Agent, or Firm* — TROUTMAN PEPPER LOCKE LLP

(57) ABSTRACT

A vehicle drive assist apparatus is to be applied to a vehicle. The vehicle drive assist apparatus includes an object recognizer, a dispersion area extractor, and a risk area setter. The object recognizer is configured to recognize an object in front of the vehicle. The dispersion area extractor is configured to extract a dispersion area where luminance values are dispersed around the recognized object. The risk area setter is configured to set, as a risk area where small objects are distributed, an area including the dispersion area.

12 Claims, 15 Drawing Sheets

(56) References Cited

U.S. PATENT DOCUMENTS

2003/0138133 A1* 7/2003 Nagaoka ................ G06V 20/58
                                                            382/104
2021/0100529 A1* 4/2021 Onodera .............. A61B 8/5207
2023/0082486 A1* 3/2023 Medjaouri ........... G01S 17/931
                                                            701/3

* cited by examiner

| RISK LEVEL L | CONDITION |
|---|---|
| LEVEL 2 | $X \leq S1$ |
| LEVEL 3 | $S1 < X \leq S2$ |
| LEVEL 4 | $S2 < X \leq S3$ |
| LEVEL 5 | $S3 < X$ |

FIG. 13

START

READ OBJECT INFORMATION ITEM — S101

IS THERE OBJECT HAVING HEIGHT EQUAL TO OR GREATER THAN PREDETERMINED HEIGHT? — S102

NO

YES

EXTRACT CENTRAL OBJECT — S103

SET ROUTE SEARCH AREA — S104

EXTRACT LUMINANCE VALUE DISPERSION AREA — S105

SET RISK AREAS — S106

RETURN

VEHICLE DRIVE ASSIST APPARATUS

CROSS-REFERENCE TO RELATED APPLICATION

The present application claims priority from Japanese Patent Application No. 2022-142520 filed on Sep. 7, 2022, the entire contents of which are hereby incorporated by reference.

BACKGROUND

The disclosure relates to a vehicle drive assist apparatus to be applied to a vehicle and configured to recognize a risk area in front of the vehicle in real time and to assist a driving operation of a driver who drives the vehicle.

In recent years, in the field of vehicles such as automobiles, drive assist apparatuses for assisting driving operations of drivers have been put into practical use for the purposes of reducing burdens of the driving operations of the drivers and improving safety. Such a drive assist apparatus performs drive assist control basically achieved by including an adaptive cruise control (ACC) function, an active lane keep centering (ALKC) control function, and the like.

To achieve such drive assist control, traffic environment information items around a vehicle are to be recognized in real time. The traffic environment information items around the vehicle generally include, in addition to an information item about a preceding vehicle traveling on a lane where the vehicle is traveling, information items about objects each having a certain risk for travel of the vehicle. For example, such objects include a stopped vehicle and the like that may collide with the vehicle.

Thus, to perform the drive assist control more safely, it is desirable to accurately set, based on the traffic environment information items, areas (risk areas) where there are objects each having the certain risk. In this case, for example, regarding the risk areas, it is desirable to set not only an area where there is an object having a high possibility of colliding with the vehicle, but also an area where there is an object that causes skidding or the like of wheels. To address such a situation, for example, Japanese Unexamined Patent Application Publication (JP-A) No. 2019-67018 discloses a vehicle display apparatus in which when first detection information from infrared thermography is input; second detection information from a radar or a sonar configured to detect that a road surface of a road is a flat road surface is input; a frozen area having a size equal to or greater than a predetermined size is detected based on the first detection information; and determination is made that there is the frozen area on the flat road surface detected based on the second detection information, information about a frozen road surface area is displayed on a display.

SUMMARY

An aspect of the disclosure provides a vehicle drive assist apparatus to be applied to a vehicle. The vehicle drive assist apparatus includes an object recognizer, a dispersion area extractor, and a risk area setter. The object recognizer is configured to recognize an object in front of the vehicle. The dispersion area extractor is configured to extract a dispersion area where luminance values are dispersed around the recognized object. The risk area setter is configured to set, as a risk area where small objects are distributed, an area including the dispersion area.

An aspect of the disclosure provides a vehicle drive assist apparatus to be applied to a vehicle. The vehicle drive assist apparatus includes a component including a camera and circuitry. The circuitry is configured to: recognize, together with the component, an object in front of the vehicle; extract a dispersion area where luminance values are dispersed around the recognized object; and set, as a risk area where small objects are distributed, an area including the dispersion area.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 13 is a diagram illustrating a method of calculating an evaluation value for a route candidate;

DETAILED DESCRIPTION

Objects that cause skidding or the like of wheels include not only a frozen area such as a frozen road but also a large number of small objects scattered on the road. Meanwhile, it may be difficult to individually recognize all of the small objects scattered on the road based on image recognition or the like. In such a case, it may be difficult to set an appropriate risk area for drive assist control.

It is desirable to provide a vehicle drive assist apparatus capable of setting an appropriate risk area for achieving drive assist control at a higher level.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
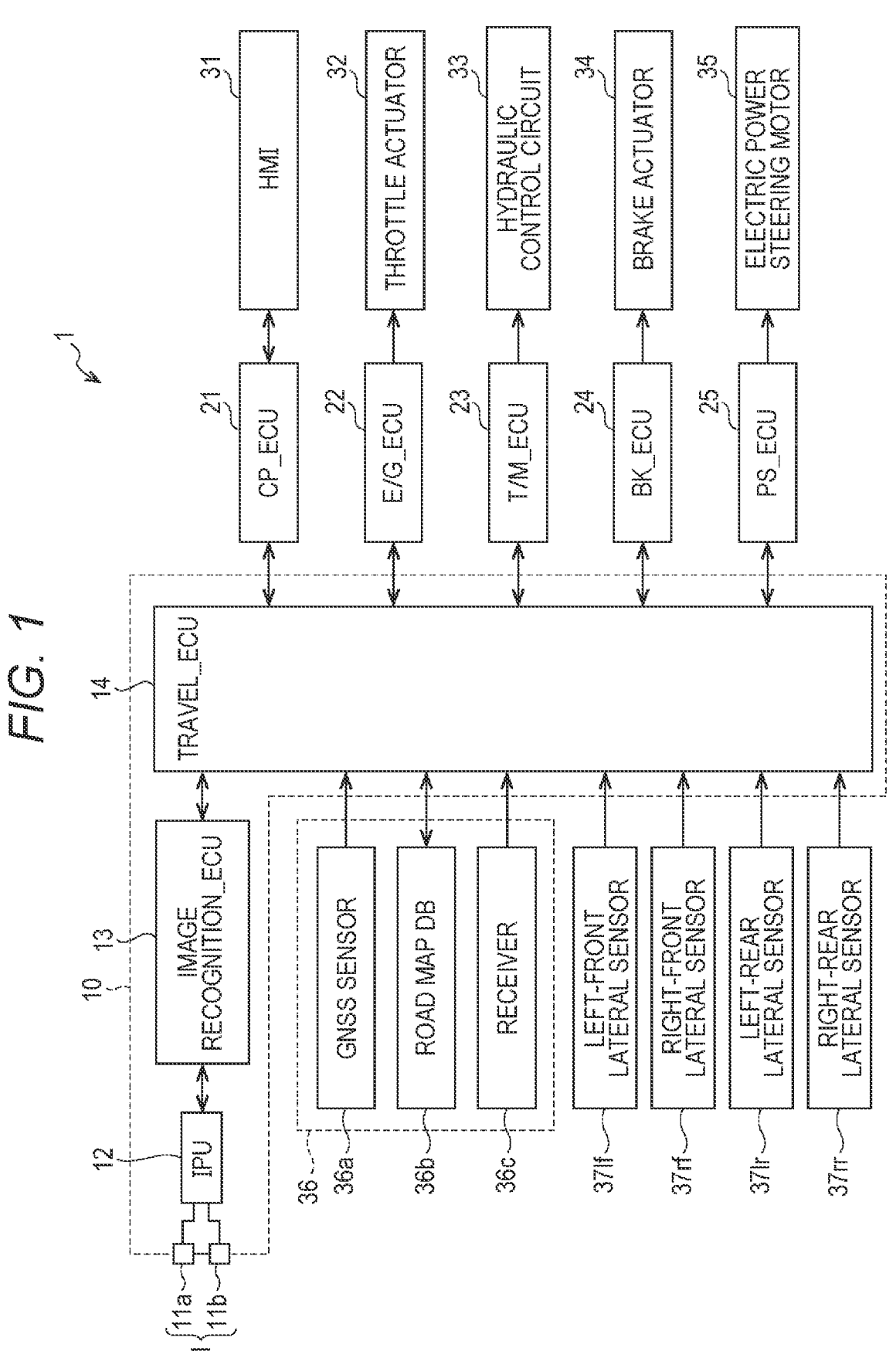
FIG. 1 is a schematic configuration diagram of a drive assist apparatus.
Figure 2:
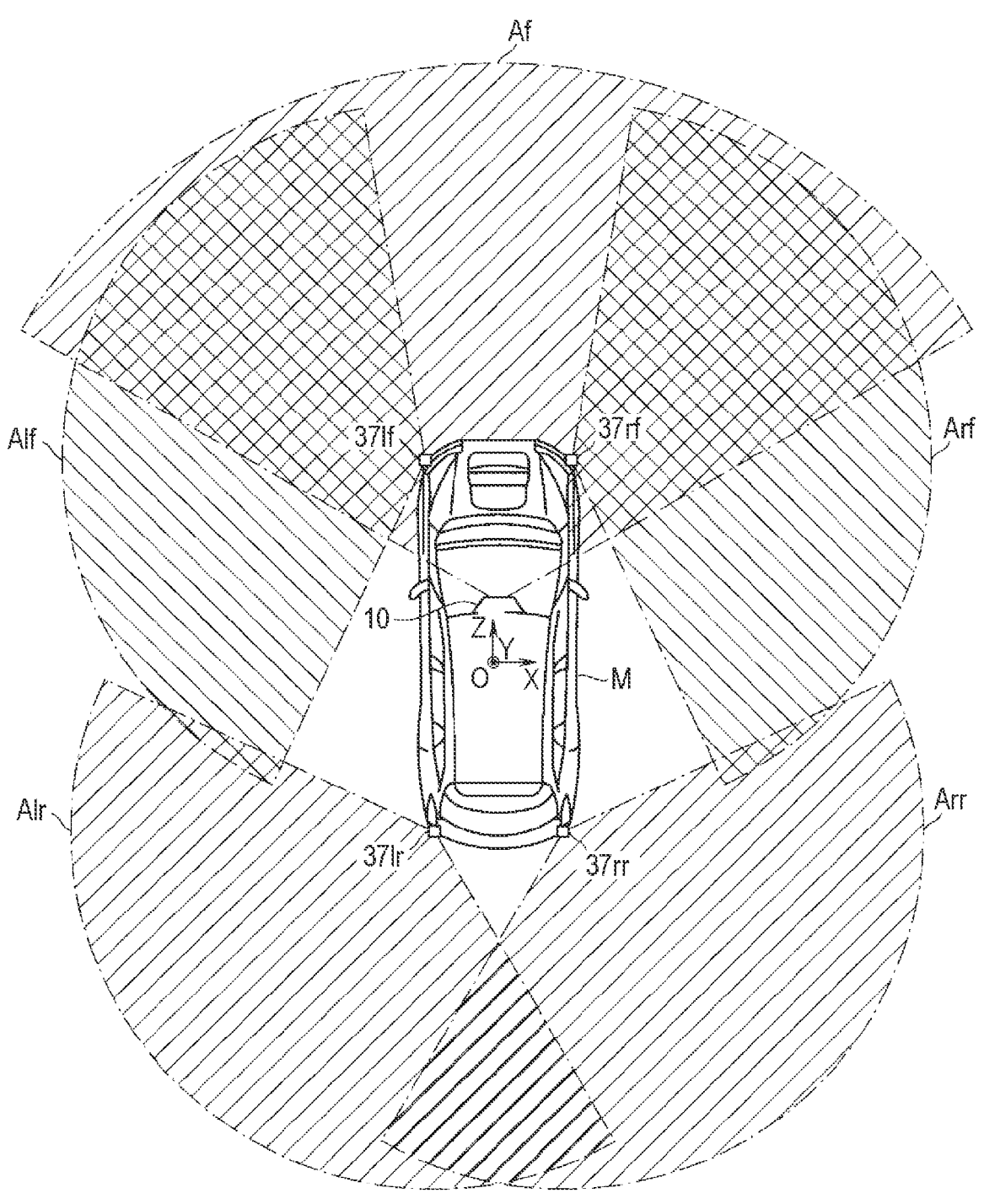
FIG. 2 is a diagram illustrating monitoring ranges of a stereo camera and a radar.

As illustrated in FIGS. 1 and 2, a drive assist apparatus 1 includes, for example, a camera unit 10 fixed on an upper center of an interior front of a vehicle M.

The camera unit 10 includes a stereo camera 11, an image processing unit (IPU) 12, an image recognition unit (image recognition_electronic control unit (ECU)) 13, and a travel control unit (travel_ECU) 14.

The stereo camera 11 includes a main camera 11*a* and a sub-camera 11*b*. For example, the main camera 11*a* and the sub-camera 11*b* each include an imaging element such as a complementary metal oxide semiconductor (CMOS). The main camera 11*a* and the sub-camera 11*b* are disposed bilaterally symmetrically with respect to the center in a vehicle width direction.

The main camera 11*a* and the sub-camera 11*b* each stereoscopically capture, from different viewpoints, an image of a traffic environment in an area Af (see FIG. 2) outside and in front of the vehicle. Imaging periods of the main camera 11*a* and the sub-camera 11*b* are synchronized with each other.

The IPU 12 performs predetermined image processing on traffic environment images captured by the stereo camera 11. Thus, the IPU 12 detects edges of various objects represented on the images. For example, the various objects include three-dimensional objects and lane lines on a road surface. Then, the IPU 12 determines a distance information item based on positional disparity between corresponding edges on left and right images. Thus, the IPU 12 generates an image information item (distance image information item) including the distance information item.

The image recognition_ECU 13 determines, based on the distance image information item and the like received from the IPU 12, a road curvature [1/m] of lane lines defining left and right of a lane (vehicle travel lane) where the vehicle M is traveling, and also determines a width (lane width) between the left and right lane lines. In addition, the image recognition_ECU 13 determines a road curvature of lane lines defining left and right of a lane or the like adjacent to the lane where the vehicle M is traveling, and also determines a width between the left and right lane lines. Various methods for determining the road curvatures and lane widths are known. For example, the image recognition_ECU 13 binarizes each pixel on a distance image based on luminance. Thus, the image recognition_ECU 13 extracts lane line candidate points on the road. Moreover, the image recognition_ECU 13 performs curve approximation using the least squares method or the like on a point sequence of the extracted lane line candidate points. Thus, the image recognition_ECU 13 determines the curvature of the left and right lane lines for each predetermined section. Furthermore, the image recognition_ECU 13 calculates the lane width from the difference in curvature between the left and right lane lines.

Furthermore, the image recognition_ECU 13 performs predetermined pattern matching or the like on the distance image information item. Thus, the image recognition_ECU 13 recognizes various objects including the three-dimensional objects. The three-dimensional objects are, for example, guardrails, curbstones, and a median strip which are along a road, and vehicles around the vehicle M. Here, to recognize the three-dimensional objects, the image recognition_ECU 13 recognizes, for example, a type of the object, a distance to the object, a velocity of the object, a relative velocity between the object and the vehicle M, and the like.

These objects also include small objects that are excluded from control targets to which control of avoiding collisions with the vehicle M is applied. For example, such small objects include a small object having a size smaller than a ground clearance of the vehicle M. However, based on factors such as resolutions of the main camera 11*a* and the sub-camera 11*b* and processing capability of image recognition_ECU 13, a small object recognized by the image recognition_ECU 13 is limited to a small object having a predetermined size. For example, in the image recognition_ECU 13 of the present embodiment, recognition of a small object (tiny object) smaller than a predetermined size is restricted. Here, as the small objects recognizable on the road, for example, scattered objects or the like resulting from a load dropped from a truck or the like are assumed.

Various information items about objects and the like recognized by the image recognition_ECU 13 are output to the travel_ECU 14 as traffic environment information items.

As described above, in one embodiment, the image recognition_ECU 13, together with the stereo camera 11 and the IPU 12, may serve as a an "object recognizer".

The travel_ECU 14 is a control unit for integrally controlling the drive assist apparatus 1.

As various control units, a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the travel_ECU 14 through an in-vehicle communication line such as a controller area network (CAN).

Furthermore, as various sensors, a locator unit 36, a left-front lateral sensor 371*f*, a right-front lateral sensor 37*rf*, a left-rear lateral sensor 371*r*, and a right-rear lateral sensor 37*rr* are coupled to the travel_ECU 14.

A human machine interface (HMI) 31 disposed in the periphery of a driver's seat is coupled to the CP_ECU 21. For example, the HMI 31 includes an operation switch, a mode selector switch, a steering touch sensor, a turn signal switch, a driver monitoring system (DMS), a touch panel display, a combination meter, a speaker, and the like. The operation switch is configured to set and perform various types of drive assist control. The mode selector switch is configured to switch drive assist modes. The steering touch sensor is configured to detect a steering wheel holding state of a driver who drives the vehicle. The DMS is configured to perform recognition of the driver's face, detection of a direction of a driver's line of sight, and the like.

Upon receiving a control signal from the travel_ECU 14, the CP_ECU 21 appropriately notifies the driver, by display, voice, and the like through the HMI 31, of various alarms for a preceding vehicle and the like, an execution status of the drive assist control, and various information items about, for example, the traffic environment around the vehicle M.

Furthermore, the CP_ECU 21 outputs, to the travel_ECU 14, various input information items having been input by the driver through HMI 31. For example, the various input information items are related to an on or off operation state for various types of drive assist control, a vehicle speed (set vehicle speed) Vs set for vehicle M, and an operation state of the turn signal switch.

A throttle actuator 32 or the like of an electronically controlled throttle is coupled to an output side of the E/G_ECU 22. Furthermore, various sensors such as an accelerator sensor and the like (not illustrated) are coupled to an input side of the E/G_ECU 22.

The E/G_ECU 22 performs drive control on the throttle actuator 32 based on a control signal from the travel_ECU 14, detection signals from the various sensors, or the like. Thus, the E/G_ECU 22 adjusts an intake air amount of an engine and generates a desired engine output. Furthermore, the E/G_ECU 22 outputs, to the travel_ECU 14, signals indicating an accelerator opening and the like detected by the various sensors.

A hydraulic control circuit 33 is coupled to an output side of the T/M_ECU 23. Furthermore, various sensors such as a shift position sensor and the like (not illustrated) are coupled to an input side of the T/M_ECU 23. The T/M_ECU 23 performs hydraulic control on the hydraulic control circuit 33 based on an engine torque signal estimated by the E/G_ECU 22, detection signals from the various sensors, or the like. Thus, the T/M_ECU 23 operates a friction engagement element, a pulley, and the like provided in an automatic transmission, and changes the engine output at a desired gear ratio. Furthermore, the T/M_ECU 23 outputs, to the travel_ECU 14, signals indicating a shift position and the like detected by the various sensors.

A brake actuator 34 is coupled to an output side of the BK_ECU 24. The brake actuator 34 adjusts a brake fluid pressure to be output to a brake wheel cylinder provided in each wheel. Furthermore, various sensors such as a brake pedal sensor, a yaw rate sensor, a longitudinal acceleration sensor, a vehicle speed sensor, and the like (which are not illustrated) are coupled to an input side of the BK_ECU 24.

The BK_ECU 24 performs drive control on brake actuator 34 based on a control signal from the travel_ECU 14 or detection signals from the various sensors. Thus, the BK_ECU 24 appropriately generates, for each wheel, braking force for performing forced braking control, yaw rate control, and the like on the vehicle M. Furthermore, the BK_ECU 24 outputs, to the travel_ECU 14, signals indicating a brake operation state, a yaw rate, a longitudinal acceleration, a vehicle speed V, and the like which are detected by the various sensors.

An electric power steering motor 35 is coupled to an output side of the PS_ECU 25. The electric power steering motor 35 applies steering torque by a rotational force of a motor to a steering mechanism. Furthermore, various sensors such as a steering torque sensor, a steering angle sensor, and the like are coupled to an input side of the PS_ECU 25.

The PS_ECU 25 performs drive control on an electric power steering motor 35 based on a control signal from the travel_ECU 14 or detection signals from the various sensors. Thus, the PS_ECU 25 generates steering torque for the steering mechanism. Furthermore, the PS_ECU 25 outputs, to the travel_ECU 14, signals indicating steering torque, steering angle, and the like which are detected by the various sensors.

The locator unit 36 includes a global navigation satellite system (GNSS) sensor 36a, a high-precision road map database (road map database (DB)) 36b, and a receiver 36c.

The GNSS sensor 36a receives positioning signals from positioning satellites, thus determining the location (latitude, longitude, altitude, and the like) of the vehicle M.

The road map DB 36b is a mass storage medium such as an HDD. The road map DB 36b stores high-precision road map information item (dynamic map). Examples of the road map information item include, as lane data used for automated driving, lane width data, lane center position coordinate data, lane heading angle data, speed limit data, and the like. The lane data is stored in each lane on the road map at intervals of several meters. For example, based on a request signal from the travel_ECU 14, the road map DB 36b outputs, to the travel_ECU 14, a road map information item as the traffic environment information item. The road map information item is related to a set range based on the location of the vehicle M determined by the GNSS sensor 36a.

For example, the receiver 36c receives, through vehicle-to-roadside-infrastructure, various traffic information items from the vehicle information communication system (VICS (registered trademark)) or the like. Examples of the traffic information items received by the receiver 36c include an information item about traffic congestion, an information item about road regulation due to an accident and weather, and the like.

For example, the left-front lateral sensor 371f and the right-front lateral sensor 37rf each include a millimeter wave radar. For example, the left-front lateral sensor 371f and the right-front lateral sensor 37rf are disposed on left and right lateral sides of a front bumper, respectively. The left-front lateral sensor 371f and the right-front lateral sensor 37rf detect, as the traffic environment information items, three-dimensional objects in areas Alf and Arf (see FIG. 2). The areas Alf and Arf are respectively left and right obliquely forward and lateralward areas with respect to the vehicle M. The three-dimensional objects in the areas Alf and Arf are not easily recognized from the images captured by the stereo camera 11.

For example, the left-rear lateral sensor 371r and the right-rear lateral sensor 37rr each include a millimeter wave radar. For example, the left-rear lateral sensor 371r and the right-rear lateral sensor 37rr are disposed on left and right lateral sides of a rear bumper, respectively. The left-rear lateral sensor 371r and the right-rear lateral sensor 37rr detect, as the traffic environment information items, three-dimensional objects in areas Alr and Arr (see FIG. 2). The areas Alr and Arr are respectively left and right obliquely lateralward and rearward areas with respect to the vehicle M. The three-dimensional objects in the areas Alr and Arr are not easily recognized by the left-front lateral sensor 371f and the right-front lateral sensor 37rf.

Here, when the sensors each include a millimeter wave radar, the sensors transmit waves and analyze the waves reflected from objects, thus enabling detection of three-dimensional objects mainly such as another vehicle traveling beside the vehicle M and another vehicle traveling behind the vehicle M. For example, the individual sensors detect, as the information items about the three-dimensional objects, lateral widths of the three-dimensional objects, positions of representative points of the three-dimensional objects (their relative positions with respect to the vehicle M), the velocities, and the like.

The coordinates of each of objects outside the vehicle are included in the traffic environment information items individually recognized by the image recognition_ECU 13, the locator unit 36, the left-front lateral sensor 371f, the right-front lateral sensor 37rf, the left-rear lateral sensor 371r, and the right-rear lateral sensor 37rr. In the travel_ECU 14, the coordinates are all converted into, for example, coordinates in a three-dimensional coordinate system (see FIG. 2) with the center of the vehicle M as an origin.

The travel_ECU 14 is set to include a manual driving mode, a first travel control mode, and a second travel control mode as driving modes, and an evacuation mode. For example, these driving modes can be selectively switched in the travel_ECU 14 based on an operation status or the like with respect to the mode selector switch provided in the HMI 31.

Here, the manual driving mode is a driving mode that involves a steering wheel holding operation performed by the driver. That is, the manual driving mode is a driving mode for allowing the vehicle M to travel in accordance with driving operations, such as a steering operation, an accelerator operation, and a brake operation, performed by the driver.

Similarly, the first travel control mode is the driving mode that involves the steering wheel holding operation performed by the driver. That is, the first travel control mode is a so-called semi-automated driving mode for allowing the vehicle M to travel while reflecting the driving operations performed by the driver. For example, the first travel control mode is achieved by the travel_ECU 14 outputting respective control signals to the E/G_ECU 22, the BK_ECU 24, and the PS_ECU 25. In the first travel control mode, mainly, adaptive cruise control (ACC), active lane keep centering (ALKC) control, active lane keep bouncing (ALKB) control, and the like are performed in an appropriate combination. Thus, the vehicle M can travel along a target travel path Rm.

Here, the adaptive cruise control is basically performed based on the traffic environment information items provided as input from the image recognition_ECU 13 or the like.

In one example, for example when the image recognition_ECU 13 or the like recognizes that a preceding vehicle is in front of the vehicle M, the travel_ECU 14 performs following traveling control as a part of the adaptive cruise control. In the following traveling control, the travel_ECU 14 sets a target inter-vehicle distance Dt and a target vehicle speed Vt based on the vehicle speed V1 and the like of the preceding vehicle. Then, the travel_ECU 14 performs acceleration and deceleration control on the vehicle M based on the target inter-vehicle distance Dt and the target vehicle speed Vt. Thus, basically, the travel_ECU 14 causes the vehicle M to travel following the preceding vehicle with the vehicle speed V being maintained at the target vehicle speed Vt while maintaining the inter-vehicle distance D at the target inter-vehicle distance Dt.

On the other hand, for example when the image recognition_ECU 13 or the like recognizes that no preceding vehicle is in front of the vehicle M, the travel_ECU 14 performs constant-speed traveling control as a part of the adaptive cruise control. In the constant-speed traveling control, the travel_ECU 14 sets, as the target vehicle speed Vt, the set vehicle speed Vs having been input by the driver. Then, the travel_ECU 14 performs acceleration and deceleration control on the vehicle M based on the target vehicle speed Vt. Thus, the travel_ECU 14 maintains the vehicle speed V of the vehicle M at the set vehicle speed Vs.

The active lane keep centering control and the active lane keep bouncing control are basically performed based on the traffic environment information items provided as input from at least one of the image recognition_ECU 13 and the locator unit 36. That is, for example, the travel_ECU 14 sets a target travel path Rm along the left and right lane lines at the center of the vehicle travel lane based on a lane line information item and the like included in the traffic environment information items. Then, based on the target travel path Rm, the travel_ECU 14 performs feedforward control, feedback control, and the like on steering, thus maintaining the vehicle M at the center of the lane. Furthermore, when the travel_ECU 14 determines that the vehicle M is highly likely to deviate from the vehicle travel lane due to the influence of a crosswind, a cant of the road, or the like, the travel_ECU 14 performs the forcible steering control for reducing the lane deviation.

The second travel control mode is a driving mode for allowing the vehicle M to travel without involving a steering wheel holding operation, an accelerator operation, and a brake operation performed by the driver. That is, the second travel control mode is a so-called autonomous driving mode for allowing the vehicle M to autonomously travel without involving driving operations performed by the driver. For example, the second travel control mode is achieved by the travel_ECU 14 outputting respective control signals to the E/G_ECU 22, the BK_ECU 24, and the PS_ECU 25. In the second travel control mode, mainly, the preceding vehicle following control, the active lane keep centering control, the active lane keep bouncing control, and the like are performed in an appropriate combination. Thus, the vehicle M can travel along a target route (route map information item).

The evacuation mode is a mode for allowing the vehicle M to automatically stop at a roadside or the like. For example, the evacuation mode is performed when the vehicle traveling in accordance with the second travel control mode cannot be continued during the vehicle traveling in accordance with the second travel control mode and the driver cannot take over the driving operations (i.e., when the driver cannot change from the second travel control mode to the manual driving mode or the first travel control mode).

In addition, in each of the driving modes, the travel_ECU 14 appropriately performs emergency avoidance control intended for an obstacle such as a vehicle having a high possibility of collision with the vehicle M. Examples of the emergency avoidance control include autonomous emergency braking (AEB) control and autonomous emergency steering control.

Figure 3:
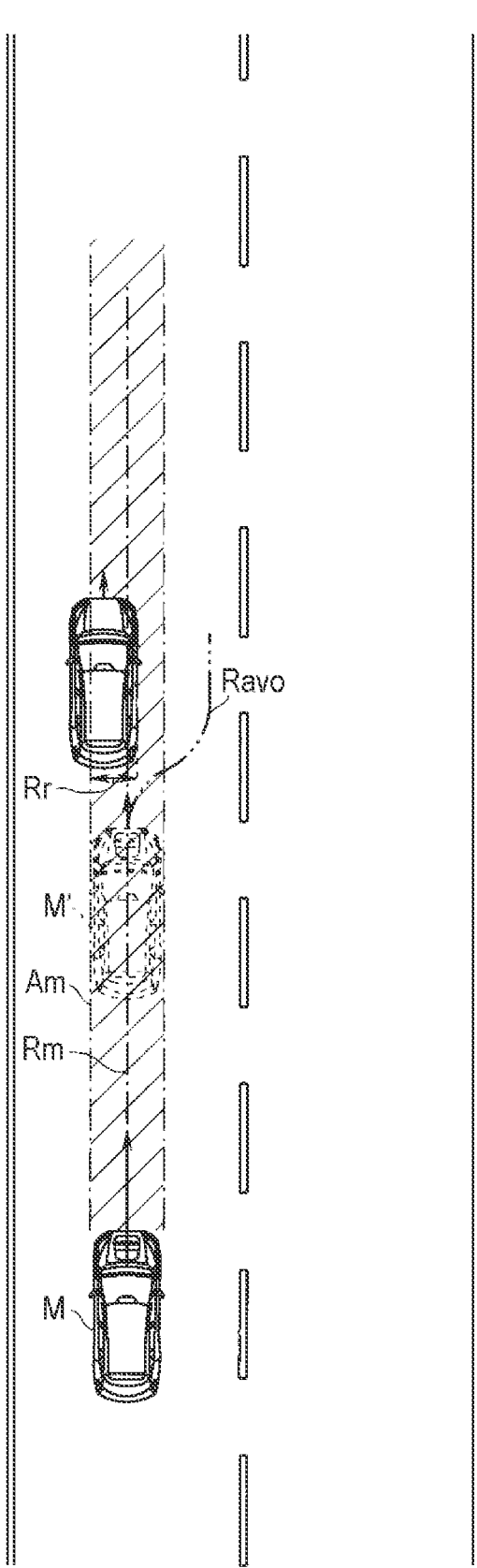
FIG. 3 is a diagram illustrating an obstacle on a target travel path of a vehicle.

Basically, the autonomous emergency braking control is control for avoiding, by braking, collision with an obstacle such as a stopped vehicle ahead on the target travel path Rm of the vehicle M. In performing the autonomous emergency braking control, for example, as illustrated in FIG. 3, the travel_ECU 14 sets a target travel area Am in front of the vehicle M. The target travel area Am has a predetermined width (e.g., a width equal to or greater than the vehicle width of the vehicle M) with the target travel path Rm as center. In addition, the travel_ECU 14 detects an obstacle, such as a preceding vehicle or a stopped vehicle, in the target travel area Am, based on the traffic environment information items. Furthermore, the travel_ECU 14 calculates a time-to-collision TTC for the obstacle. The time-to-collision TTC is calculated based on a relative velocity and a relative distance between the vehicle M and the obstacle.

Then, the travel_ECU 14 performs primary brake control when the time-to-collision TTC becomes smaller than a first threshold value Tth1 set in advance. When the primary brake control is started, the travel_ECU 14 causes the vehicle M to decelerate using a first target deceleration a1 (e.g., 0.4 G) set in advance.

Furthermore, the travel_ECU 14 performs secondary brake control when the time-to-collision TTC becomes smaller than a second threshold value Tth2 set in advance (where Tth2<Tth1). When the secondary brake control is started, the travel_ECU 14 causes the vehicle M to decelerate using a second target deceleration a2 (e.g., 1 G) set in advance until the relative velocity between the vehicle M and the obstacle becomes "0".

The autonomous emergency steering control is control for avoiding, by steering, collision with an obstacle ahead on the target travel path Rm of the vehicle M. For example, when the travel_ECU 14 determines that the collision with the obstacle cannot be avoided by the secondary brake control, the travel_ECU 14 performs the autonomous emergency steering control instead of the autonomous emergency braking control or in combination with the autonomous emergency braking control.

For example, the travel_ECU 14 performs the autonomous emergency steering control (e.g., see vehicle M' in FIG. 3) when the time-to-collision TTC becomes smaller than a third threshold value Tth3 set in advance (where Tth3<Tth2).

In performing the autonomous emergency steering control, the travel_ECU 14 sets a target lateral position on a lateral side of the obstacle. Furthermore, the travel_ECU 14 sets a new target travel path Ravo for the vehicle M to reach the target lateral position. For example, the new target travel path Ravo is divided into a turn-from-center section and a return-to-center section. The turn-from-center section is a section in which the vehicle M is allowed to turn to the lateral side of the obstacle and avoid the obstacle. The return-to-center section is a section in which the vehicle M is allowed to return its orientation in the direction along the lane where the vehicle M is traveling. Then, the travel_ECU 14 performs steering control along the new target travel path Ravo.

Note that the travel_ECU 14 can variably set the first to third threshold values Tth1 to Tth3 in accordance with a lap rate Rr of the obstacle in the vehicle width direction with respect to the vehicle M. For example, the lap rate Rr is calculated based on the entry amount of the obstacle into the target travel area Am. Then, for example, using a map or the like set in advance, the travel_ECU 14 sets the first to third threshold values Tth1 to Tth3 to be greater as the lap rate Rr is higher.

Furthermore, for example, the travel_ECU 14 performs, as extended control in the emergency avoidance control, avoidance control intended for objects (risk objects) each having a risk of hindering stable travel of the vehicle M. Examples of the risk objects include scattered objects resulting from a load and the like dropped from a truck onto a road. In one example, when the scattered objects are objects each having a height lower than the ground clearance of the vehicle M, such scattered objects are basically excluded from control targets to which control of avoiding collisions with the vehicle M is applied. On the other hand, when a large number of scattered objects are on the road, such scattered objects may have a risk of hindering stable travel of the vehicle M. For example, a large number of scattered objects on the road may have a risk of causing skidding, bursting, or the like of the wheels of the vehicle M. Thus, the travel_ECU 14 performs avoidance control intended for risk objects such as scattered objects.

In performing the avoidance control intended for the risk objects, the travel_ECU 14 extracts objects that are in front of vehicle M and each have a size equal to or greater than a predetermined size (objects each having a height equal to or greater than a predetermined height), from among various objects recognized by the image recognition_ECU 13. Note that, in the present embodiment, for example, an object such as a vehicle recognized by pattern matching or the like is excluded from the objects to be extracted. Furthermore, the travel_ECU 14 extracts areas on a road surface where luminance values are dispersed around the extracted objects. Hereinafter, the area where luminance values are dispersed may be referred to as a "luminance value dispersion area". Then, the travel_ECU 14 sets areas including the extracted luminance value dispersion areas, as risk areas Ar where small objects such as scattered objects are distributed.

Figure 4:
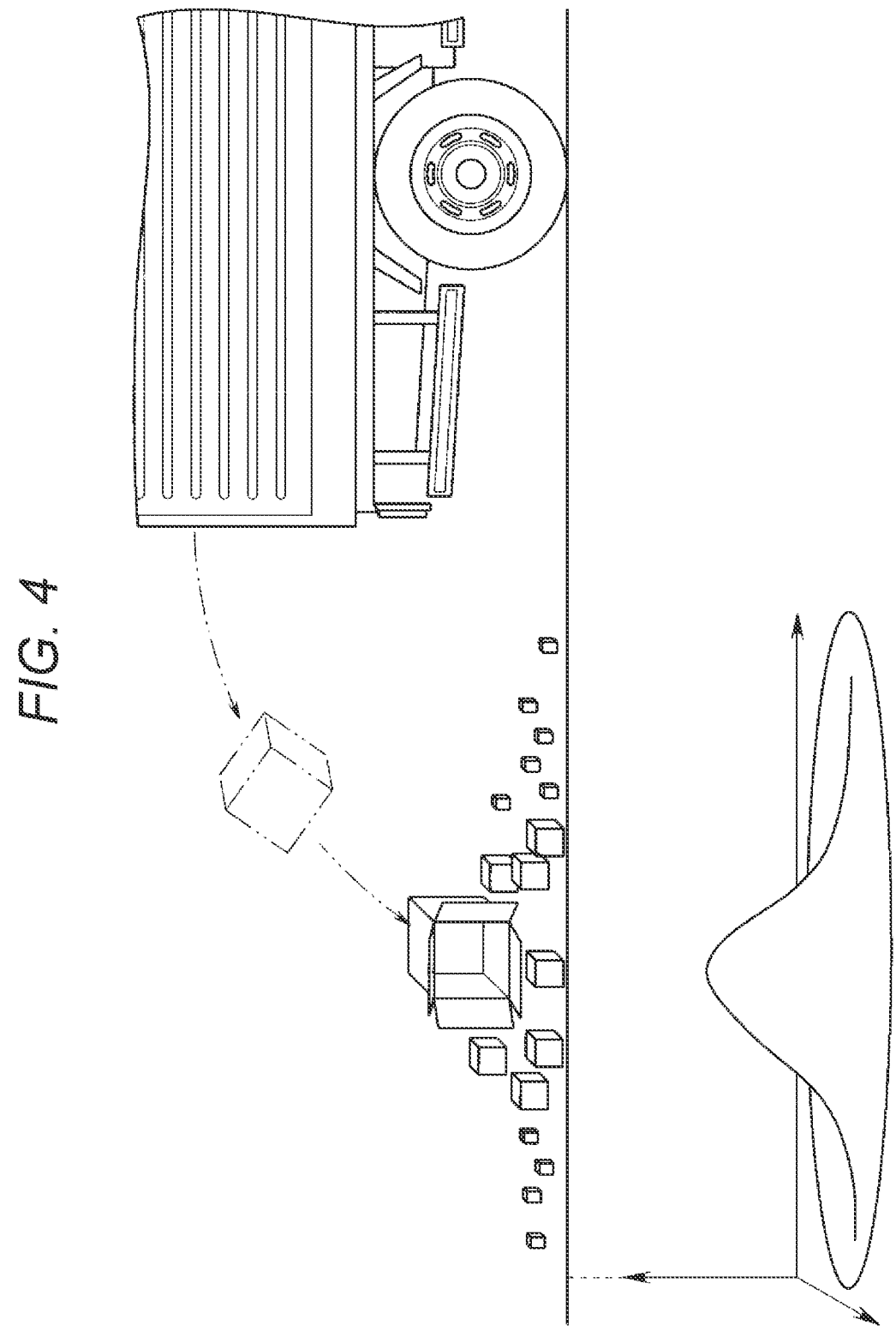
FIG. 4 is a diagram illustrating an example of a scattered state of objects when a load drops.

In one example, for example as illustrated in FIG. 4, the scattered objects are mostly caused by a drop of the load carried on a truck or the like onto a road. In many cases, such a load drops in a state of being packed in a packing container such as a cardboard box, and results in scattering on a road by impact of the drop. The packing container or the like from which such scattering of the load originates usually has a size (height) equal to or greater than a predetermined size (height). Consequently, the packing container or the like can be sufficiently recognized as an object also in the image recognition_ECU 13. Thus, for example, from among the objects recognized as the traffic environment information items, the travel_ECU 14 extracts, as a central object, an object that is in front of the vehicle M and has a height equal to or greater than a set height.

On the other hand, among the scattered objects and the like, there are many small objects each having a size smaller than a size recognizable as an object by the image recognition_ECU 13. Here, the luminance values of the small objects are usually different from the luminance value of the road surface. Thus, when the small objects are scattered around the central object, dispersion (variation) of the luminance values occurs in an area on a road surface where the small objects are scattered. Such dispersion of the luminance values occurs when small objects are on the road surface. That is, the dispersion of the luminance values occurs regardless of whether the small object on the road surface has a size recognizable as an object by the image recognition_ECU 13. Thus, the travel_ECU 14 extracts, as the dispersion area, an area on a road surface where the luminance values are dispersed in a predetermined manner around each extracted central object.

Figure 5:
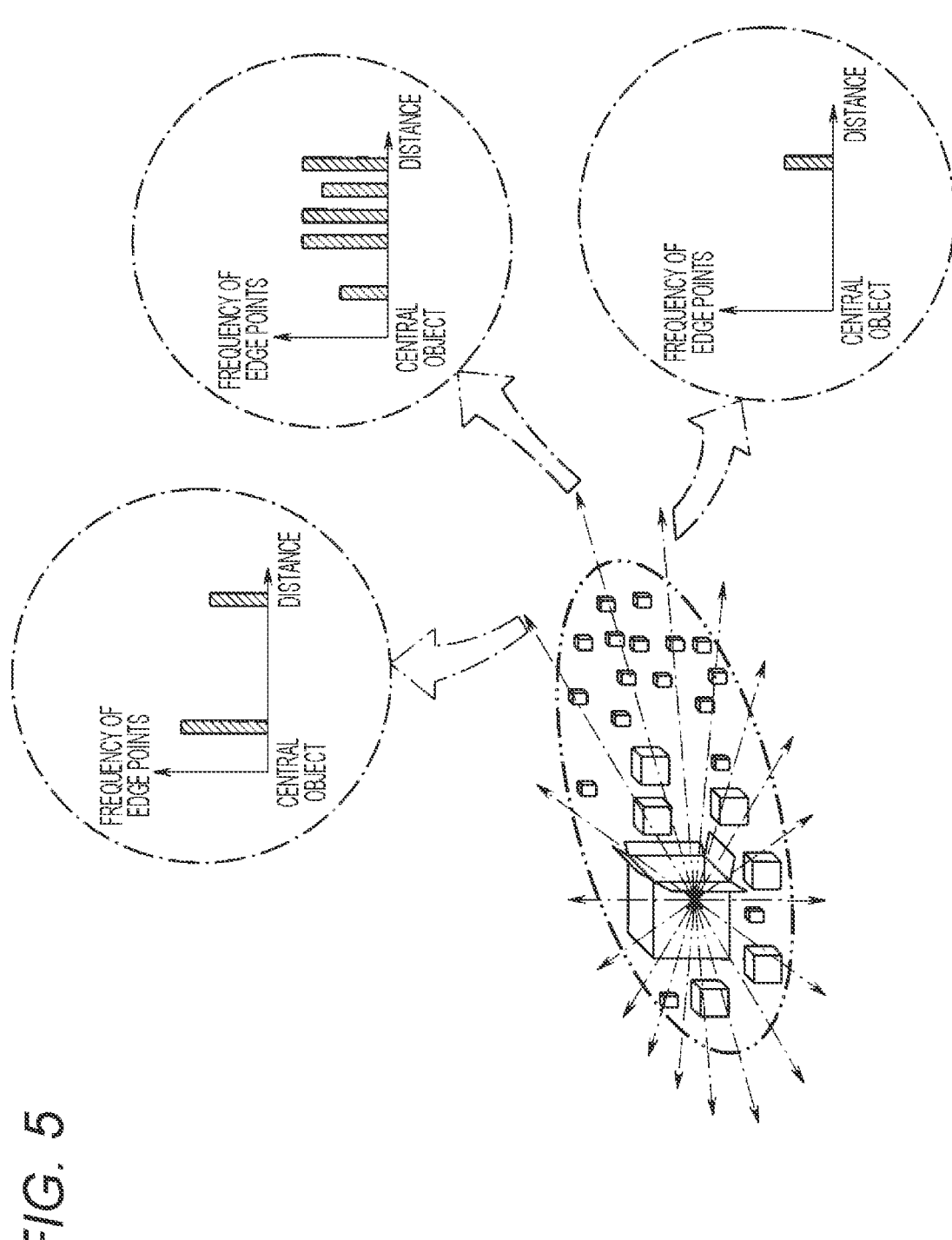
FIG. 5 is a diagram illustrating a relationship between frequency distribution resulting from edges of scattered objects and a circumscribed circle.

For example, in a distance image generated by the IPU 12, an edge point is usually located at a point where a luminance value changes between a road surface and the small object. Thus, for example, the travel_ECU 14 can extract the dispersion area based on distribution of edge points around the central object. In extracting the dispersion area, for example, the travel_ECU 14 sets luminance evaluation lines extending from the central object. For example, as indicated by alternate long and short dashed lines in FIG. 5, the luminance evaluation lines are set in radial directions (respective radial directions at every set angle) along the road surface with the central object as the center. The travel_ECU 14 counts the number (frequency) of edge points at predetermined intervals along each luminance evaluation line. Furthermore, the travel_ECU 14 evaluates the frequency distribution of the edge points for each luminance evaluation line. Thus, the travel_ECU 14 extracts the luminance value dispersion area on a road surface. For example, the travel_ECU 14 extracts, for each luminance evaluation line (radial direction), a distance from the central object to a terminal position where there is an edge point of a set frequency or more. Then, the travel_ECU 14 sets, as the luminance value dispersion area, an area within each distance extracted for each luminance evaluation line.

The travel_ECU 14 further sets an area including the dispersion area, as a risk area Ar where the small objects are distributed. The risk area Ar is desirably as small as possible. Thus, the risk area Ar is desirably set, for example, with an ellipse circumscribing the area where the small objects are distributed being as a contour. In this case, it is desirable that the travel_ECU 14 set the major axis of the circumscribed ellipse in the direction in which the distance from the central object to the terminal position is the longest among the respective radial directions.

Figure 6:
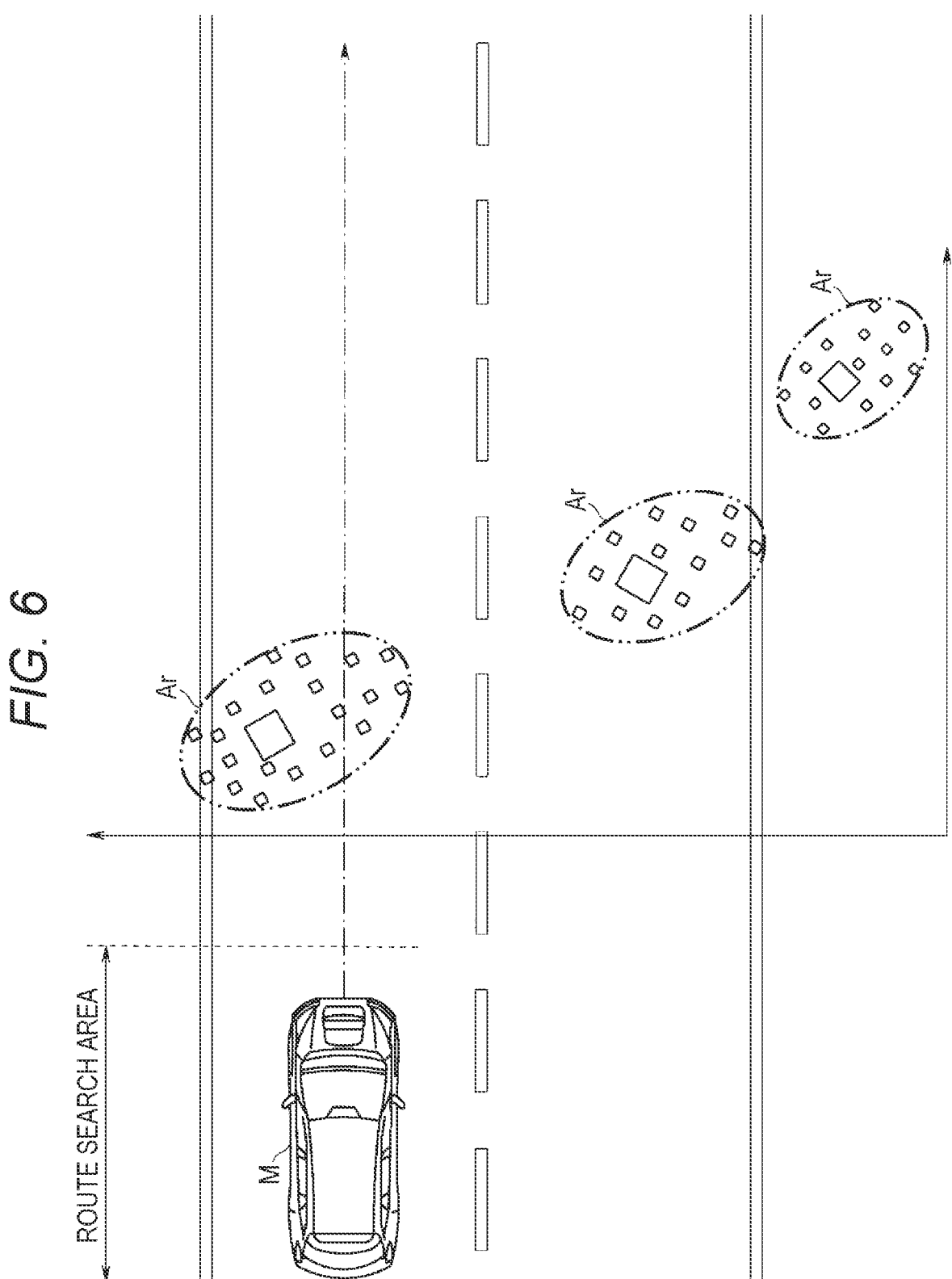
FIG. 6 is a diagram illustrating risk areas including scattered objects on a road.

In setting the risk area Ar, the travel_ECU 14 also sets a route search area (e.g., see FIG. 6). The route search area is an area for searching for an optimum route in order to allow the vehicle M to travel while avoiding the risk area Ar. Thus, the route search area is set to a predetermined section before the risk area Ar. Note that the optimum route searched for in the route search area is set as a vehicle travel route.

The travel_ECU 14 further sets a risk level L for each set risk area Ar. The risk level L is set mainly based on a distribution state of the small objects within the risk area Ar. In one example, the risk level L is set based on the distribution of the height information items within the risk area Ar.

Figure 8:
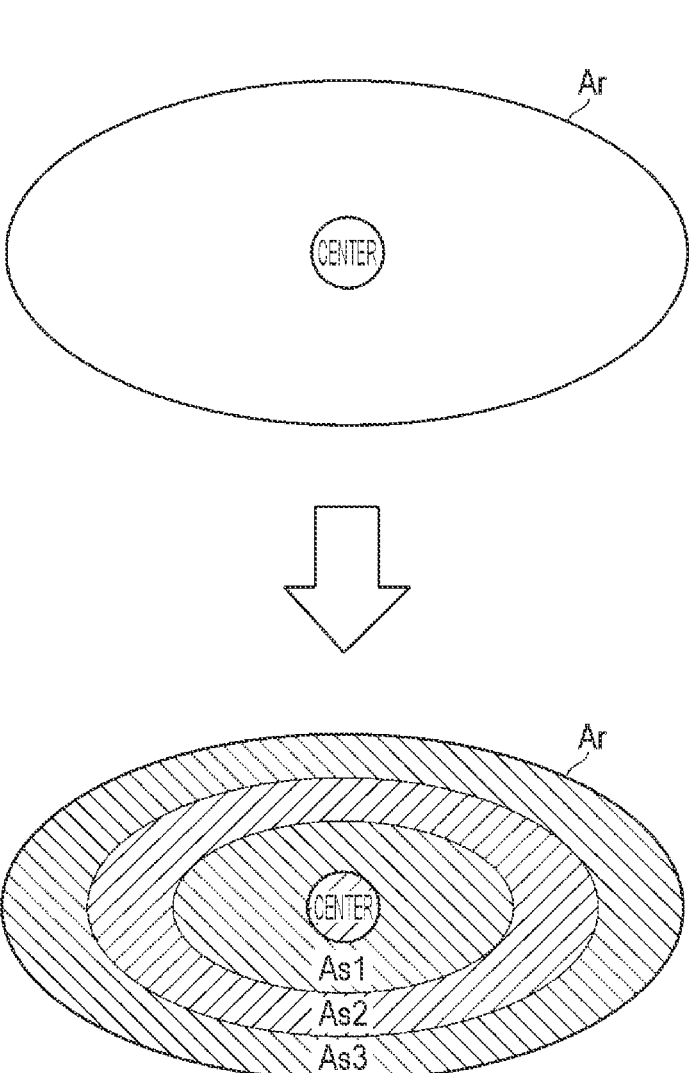
FIG. 8 is a diagram illustrating small areas set within a risk area.

Here, it is desirable that the travel_ECU 14 divide the risk area Ar into small areas and set the risk level L for each of the divided small areas. In this case, for example, as illustrated in FIG. 8, the travel_ECU 14 defines the small areas by multiple ellipses similar to a circumscribed ellipse serving as the outer shell of the risk area Ar. Note that each of the ellipses defining the small areas is desirably set based on the position of the central object.

In setting the risk level L, the travel_ECU 14 calculates, based on the height of the road surface, entropy E of the height information items within the risk area Ar. The travel_ECU 14 extracts a maximum value H of the height information items within the risk area Ar. The travel_ECU 14 further calculates change amounts I in the height information items within the risk area Ar. Then, the travel_ECU 14 calculates an evaluation value X of the scattered objects within the risk area Ar, based on the entropy E of the height information items, the maximum value H of the height information items, and the change amounts I of the height information items. Note that, in calculating the evaluation value X of the scattered objects, any of the entropy E of the height information items, the maximum value H of the height information items, and the change amounts I of the height information items can be appropriately omitted. Furthermore, in calculating the evaluation value X of the scattered objects, another evaluation value can be added.

Here, for example, the evaluation value X of the scattered objects in the present embodiment indicates the level of risk that the scattered objects within the risk area Ar exert on the vehicle M. Thus, the travel_ECU 14 can set the risk level L for the risk area Ar with respect to the vehicle M, based on the evaluation value X of the scattered objects. When the risk area Ar is divided into small areas As (As1, As2, . . . ), the travel_ECU 14 sets the risk level L for each of the small areas As.

In one example, in calculating the entropy E of the height information items, for example, the travel_ECU 14 extracts a height information item hi for each of sampling points i set within the small areas As from the distance image generated in the IPU.

Here, as the sampling points i, for example, all pixels within the small areas As or pixels on predetermined search lines set within the small areas As can be set. Furthermore, as each height information item hi, for example, a difference (relative height) in a height direction between the stereo camera 11 and each sampling point i is used.

Then, the travel_ECU 14 calculates the entropy E of the height information items within the small areas As, for example, using Equation (1) below.

$$E = \frac{\sum_{i=1}^{n}(hi - h0)}{n} \tag{1}$$

Figure 9:
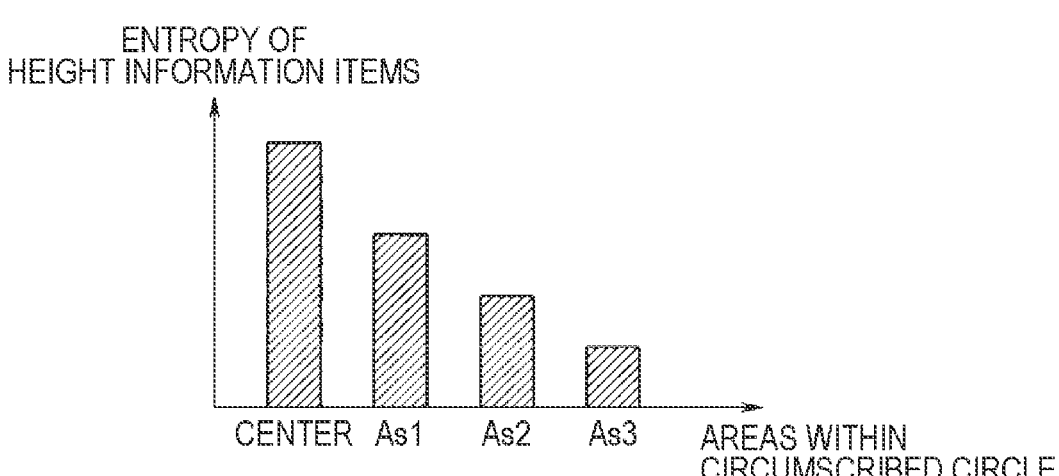
FIG. 9 is a characteristic diagram illustrating a relationship between each small area within the risk area and entropy of height information items.

Here, in Equation (1), n represents a total number of data items extracted within the small areas As. Furthermore, h0 represents a height (mounting height) of the stereo camera 11 from the road surface. Thus, for example, as illustrated in FIG. 9, the entropy E of the height information items with respect to the road surface is calculated in each of the small areas As within the risk area Ar.

Figure 10:
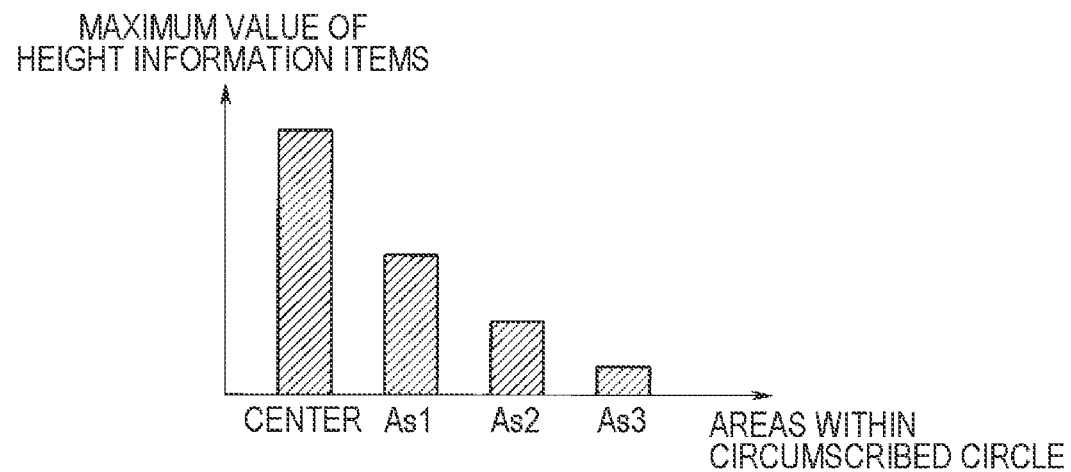
FIG. 10 is a characteristic diagram illustrating a relationship between each small area within the risk area and a maximum value of height information items.

Furthermore, in extracting the maximum value H of the height information items, the travel_ECU 14 extracts the height information item hi for each of the sampling points i set within the small areas As. Then, the travel_ECU 14 extracts, as the maximum value H of the height information items, the maximum value of the extracted height information items hi. Thus, for example, as illustrated in FIG. 10, the maximum value H of the height information items is extracted in each of the small areas As within the risk area Ar.

In calculating the change amounts I in the height information items, the travel_ECU 14 reads out the entropy E of the height information items in the small areas As calculated before the set time (e.g., several tens of frames before). Then, the travel_ECU 14 calculates, as the change amounts I of the height information items, a difference between the entropy E of the height information items in the small areas As calculated before the set time and the entropy E of the height information items in the small areas As calculated this time (e.g., see FIG. 11).

Then, the travel_ECU 14 calculates an evaluation value X of the scattered objects, for example, using Equation (2) below.

$$X=(a \times E)+(b \times H)+(c \div I) \tag{2}$$

Here, in Equation (2), a, b, and c represent constants (gains) set in advance. As is apparent from Equation (2), the greater the entropy E of the height information items, the greater the evaluation value X (risk evaluation value) of the scattered objects. This is because the greater the entropy E of the height information items of the scattered objects, the greater the influence of the scattered objects on the vehicle M. In addition, the greater the maximum value H of the height information items, the greater the evaluation value X of the scattered objects. This is because the greater the maximum value H of the height information items, the greater the influence of the scattered objects on the vehicle M. In addition, the larger the change amounts I in the height information items, the smaller the evaluation value X of the scattered objects. When the change amounts I of the height information items are large, it is assumed that the scattered objects are lightweight objects (e.g., objects made of resin, paper, or the like) that are easily moved by wind or the like. Therefore, the influence of such scattered objects on the vehicle M is smaller.

Here, the evaluation value X of the scattered objects calculated for each of the small areas As of the risk area Ar is desirably corrected as appropriate based on the relative relationship between the evaluation values X in the small areas As. For example, when the evaluation value X of the small area As located on an outer peripheral side is greater than the evaluation value X of the small area As located on an inner peripheral side among the small areas As within the risk area Ar, the evaluation value X of the small area As located on the inner peripheral side is desirably corrected to a value equal to or greater than the evaluation value X of the small area As located on the outer peripheral side.

Figures 11, 12:
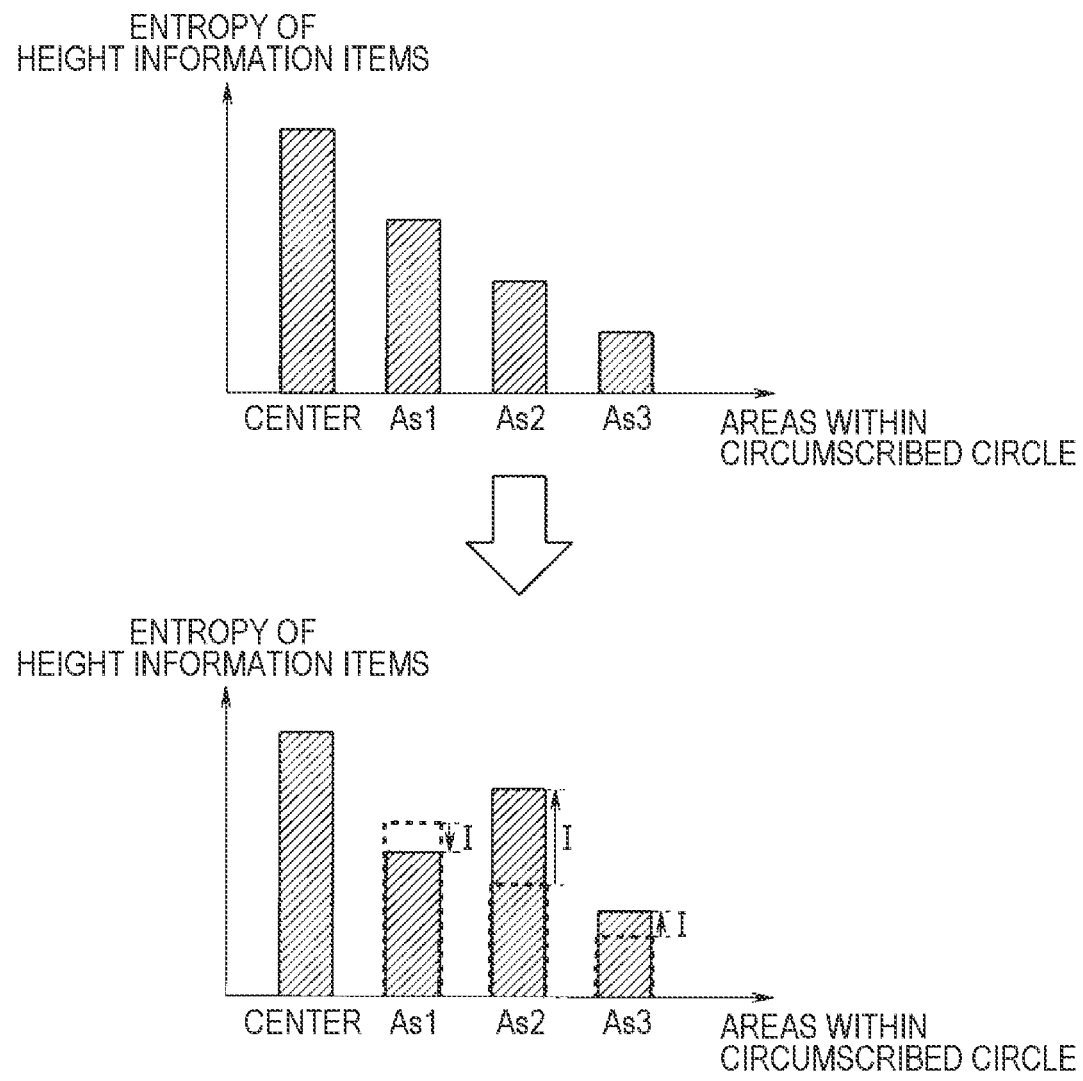
FIG. 11 is a characteristic diagram illustrating time-varying changes in the relationship between each small area within the risk area and the entropy of the height information items.
FIG. 12 is a map illustrating a setting condition of a risk level.

Furthermore, the travel_ECU 14 sets the risk level L for each of the small areas As based on the calculated evaluation value X of the scattered objects in each of the small areas As. For example, as illustrated in FIG. 12, the risk level L is set mainly based on comparison between the evaluation value X and threshold values S1, S2, and S3 set in advance (where, S1<S2<S3).

At that time, the travel_ECU 14 corrects the threshold values S1 to S3 in accordance with external factors. For example, the travel_ECU 14 corrects the threshold values S1 to S3 based on the travel speed (vehicle speed V) of vehicle M. That is, even with the same scattered objects, the impact of the scattered objects on the vehicle M increases as the vehicle speed V increases. Thus, for example, the travel_ECU 14 corrects each of the threshold values S1 to S3 in accordance with a speed range (e.g., a high speed range (80 km/h or more), a middle speed range (50 km/h or more and less than 80 km/h), or a low speed range (less than 50 km/h)) of the vehicle speed V. For example, the travel_ECU 14 can correct each of the threshold values S1 to S3 to a smaller value as the vehicle speed V increases. In addition, the travel_ECU 14 can correct each of the threshold values S1 to S3 in accordance with the recognition accuracy of each object within the risk area Ar. In this case, the travel_ECU 14 can correct each of the threshold values S1 to S3 to a smaller value as the recognition accuracy of each object within the risk area Ar is lower.

Using the threshold values S1 to S3 thus corrected, the travel_ECU 14 sets the risk level L based on the evaluation value X in each of the small areas As. For example, as illustrated in FIG. 12, the travel_ECU 14 sets the risk levels L to 2 to 5 based on the relationship between the evaluation value X and the threshold values S1 to S3.

Here, even when the risk area Ar is set in front of the vehicle M, the emergency avoidance control intended for the set risk area Ar is eliminated when no risk area Ar is in the travel area of the vehicle M. Thus, when none of the set risk areas Ar is in the travel area of the vehicle M, the travel_ECU 14 appropriately sets the risk level L to "1" regardless of the evaluation value X.

When the risk area Ar is set and the risk level L is high (e.g., when the risk level L is 3 or more), the travel_ECU 14 performs avoidance control intended for the risk area Ar.

In performing the avoidance control, the travel_ECU 14 sets a vehicle travel route that is an avoidance route for causing the vehicle M to travel while avoiding the risk area Ar. The vehicle travel route is set while the vehicle M travels within the route search area.

In one example, the travel_ECU 14 sets patterns of route candidates Ri for allowing the vehicle M to avoid the risk resulting from the risk area Ar. Then, the travel_ECU 14 calculates a route evaluation value Esum for each route candidate Ri.

For example, the route evaluation value Esum is calculated using a first evaluation value Ssum based on the arrangement of the risk areas Ar on the road, a second evaluation value Rsum based on the relative relationship between the risk areas Ar and the vehicle M, and a third evaluation value Dsum based on the shape of the route candidate Ri. In calculating the route evaluation value Esum, any of the first to third evaluation values can be appropriately omitted. Furthermore, in calculating the route evaluation value Esum, another evaluation value can be added.

Figure 13:
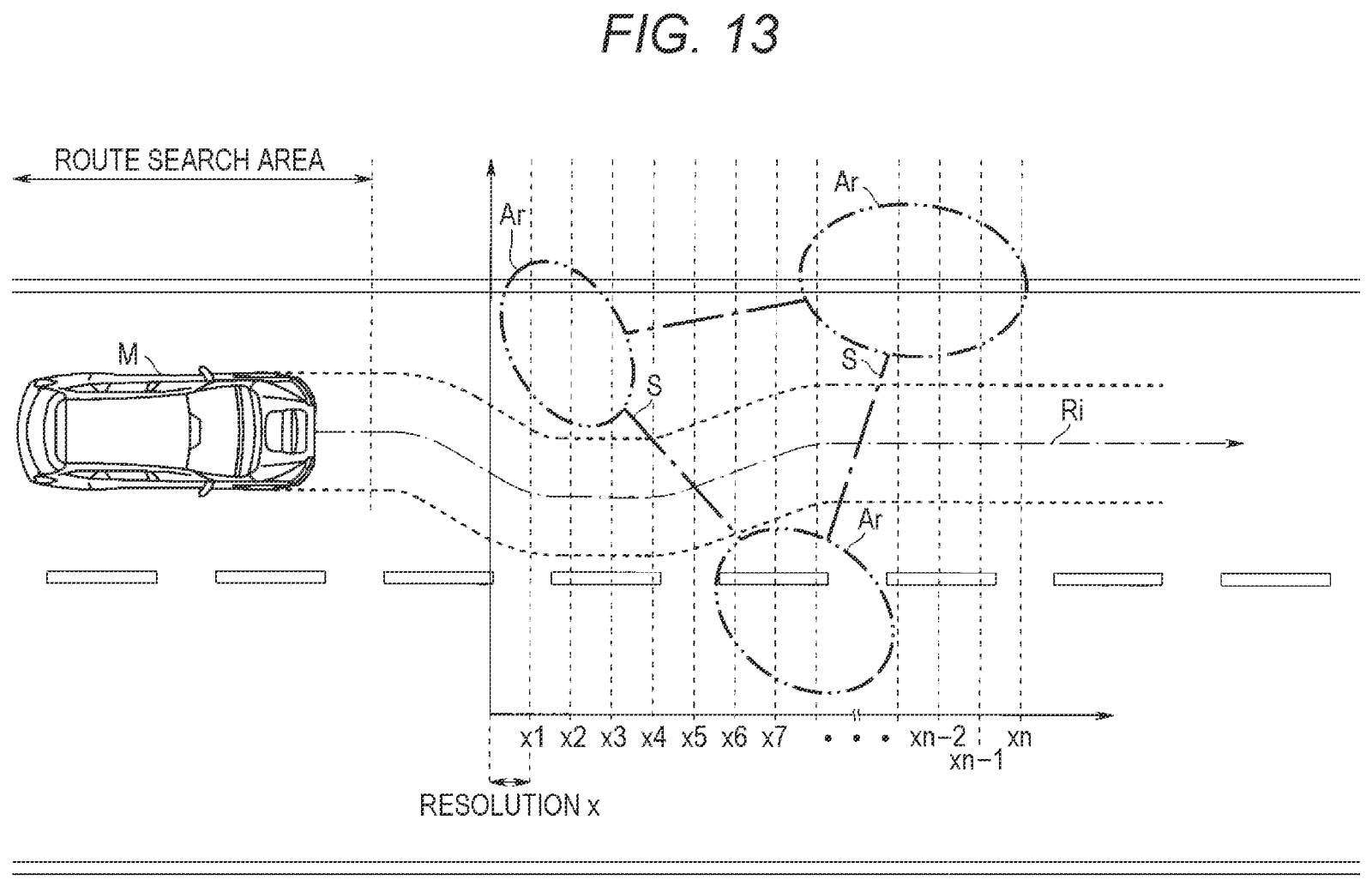

For example, the first evaluation value Ssum is calculated when risk areas Ar are in front of the vehicle M. In calculating the first evaluation value Ssum, the travel_ECU 14 sets, as combining lines S, predetermined shortest straight lines coupling the risk areas Ar (see FIG. 13). Then, the travel_ECU 14 calculates a total line length of the combining lines S as the first evaluation value Ssum. However, in calculating the first evaluation value Ssum, a line length of the shortest straight line at a position irrelevant to the travel route of the vehicle M is excluded.

The second evaluation value is calculated based on the estimated relative relationship between the vehicle M and the risk areas Ar when it is assumed that the vehicle M travels along the route candidate Ri. In calculating the second evaluation value Rsum, the travel_ECU 14 sets an evaluation point xi (x1, x2, . . . xn) at a position for each set distance (resolution) x in front of the vehicle M (see FIG. 13).

Furthermore, the travel_ECU 14 estimates a relative relationship between the vehicle M and the risk areas Ar when it is assumed that the vehicle M travels along the route candidate Ri. The relative relationship between the vehicle M and the risk areas Ar is estimated every time the vehicle M reaches the evaluation point xi. Furthermore, the travel_ECU 14 calculates a reward Nxi based on the relative relationship between the vehicle M and the risk areas Ar at each evaluation point xi. Then, the travel_ECU 14 calculates the second evaluation value Rsum for the route candidate Ri by totaling the rewards Ri obtained at the evaluation points xi.

Here, each reward Nxi is calculated based on the relationship among a position of each wheel (left front wheel, right front wheel, left rear wheel, and right rear wheel) every time the vehicle M reaches each evaluation point xi, each risk area Ar, and each combining line S (shortest straight line). For example, when any wheel is at a position passing through the risk area Ar at the timing when the vehicle M reaches the evaluation point xi, the travel_ECU 14 gives the wheel concerned a negative reward corresponding to the risk level L within the risk area Ar concerned. Furthermore, for example, when any wheel is at a position passing through the combining line S at the timing when the vehicle M reaches the evaluation point xi, the travel_ECU 14 gives the wheel concerned a positive reward set in advance. Then, the travel_ECU 14 calculates the reward Nxi for each of the evaluation points xi by totaling the rewards given in accordance with the states of the wheels. The travel_ECU 14 further calculates the second evaluation value Rsum by totaling the rewards Ri for the evaluation points xi.

For example, the third evaluation value Dsum is calculated by totaling the slopes (absolute values of the slopes) of the route candidate Ri at the evaluation points xi. Here, the slope of the route candidate Ri is, for example, a slope with respect to the traveling direction of the vehicle M. Thus, at the evaluation point xi having a large slope, the vehicle M involves a large steering amount to travel along the route candidate Ri.

Then, the travel_ECU 14 calculates a route evaluation value Esum for the route candidate Ri based on the first evaluation value Ssum, the second evaluation value Rsum, and the third evaluation value Dsum. For example, the route evaluation value Esum is calculated by Equation (3) below.

$$Esum = \frac{a}{Rsum} + (b \times Dsum) + (c \times Ssum) \qquad (3)$$

Here, in Equation (3), a, b, and c represent constants (gains) set in advance.

Such a route evaluation value Esum is calculated for each set route candidate Ri. Furthermore, when the vehicle M is traveling within the route search area, the travel_ECU 14 appropriately corrects the sizes of the risk areas Ar and repeatedly performs similar processing (processing of calculating the route evaluation value Esum).

Then, the travel_ECU 14 sets, as the vehicle travel route, the route candidate Ri for which the optimum route evaluation value Esum has been calculated.

Here, in the present embodiment in which the route evaluation value Esum is calculated based on Equation (3) above, the travel_ECU 14 extracts the minimum value among route evaluation values Esum, as the optimum route evaluation value Esum. The second evaluation value Rsum increases when interference of the vehicle M with the risk areas Ar decreases. As is apparent from Equation (3), this is because the route evaluation value Esum decreases as the second evaluation value Rsum increases. The third evaluation value Dsum decreases when the route candidate Ri is a natural route that does not involve excessive steering. As is apparent from Equation (3), this is because the route evaluation value Esum increases as the third evaluation value Dsum increases. The first evaluation value Ssum decreases when the outer shell of the risk area Ar increases. In this case, the risk area Ar includes as many risk objects as possible. As is apparent from Equation (3), this is because the route evaluation value Esum increases as the first evaluation value Ssum increases.

When the vehicle travel route with respect to the risk areas Ar is set as described above, for example, the travel_ECU 14 performs, as interruption control, travel control in accordance with the set vehicle travel route.

As described above, in one embodiment, the travel_ECU 14 may serve as a "dispersion area extractor" and a "risk area setter".

Figure 14:
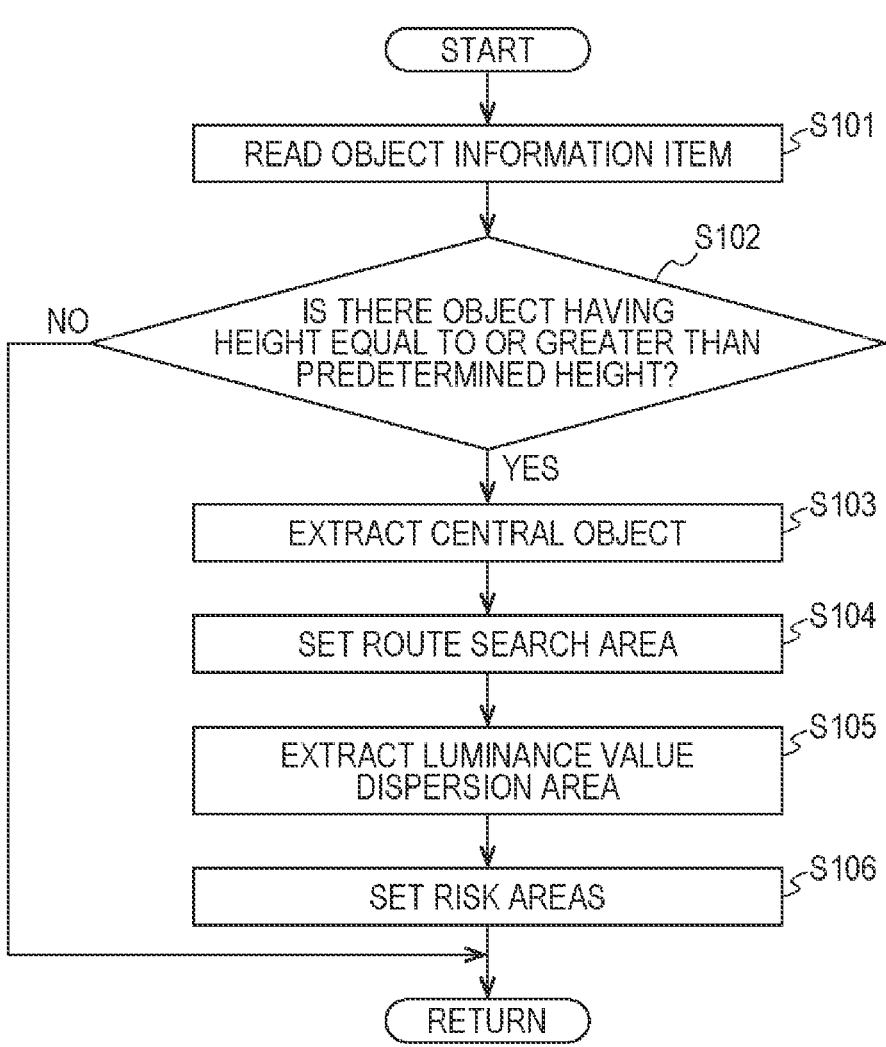
FIG. 14 is a flowchart illustrating a risk area setting routine.

Next, the setting of the risk areas Ar performed by the travel_ECU 14 will be described with reference to a flowchart of a risk area setting routine illustrated in FIG. 14. This routine is repeatedly performed at every set time in the travel_ECU 14.

When the routine is started, in step S101, the travel_ECU 14 reads an object information item about an object in front of the vehicle M. That is, for example, the travel_ECU 14 reads an object information item about an object in front of the vehicle M among the traffic environment information items recognized by the image recognition_ECU 13.

Then, in step S102, the travel_ECU 14 determines, based on the object information item, whether an object having a height equal to or greater than the predetermined height is in front of the vehicle M.

When the travel_ECU 14 determines in step S102 that there is no object having a height equal to or greater than the predetermined height (step S102: NO), the travel_ECU 14 directly exits the routine.

On the other hand, when the travel_ECU 14 determines in step S102 that there is an object having a height equal to or greater than the predetermined height (step S102: YES), the travel_ECU 14 proceeds to step S103.

In step S103, the travel_ECU 14 extracts, as a central object, the object that is in front of the vehicle M and has the height equal to or greater than the predetermined height.

Then, in step S104, the travel_ECU 14 sets a route search area. That is, for example, the travel_ECU 14 selects a central object closest to the vehicle M among central objects. Then, for example, the travel_ECU 14 sets a route search area at a position away from the selected central object toward the vehicle M by a set distance (see FIGS. 6 and 13).

Then, in step S105, the travel_ECU 14 extracts a luminance value dispersion area around each central object. That is, for example, the travel_ECU 14 sets luminance evaluation lines extending in the radial directions from the central object. Then, for example, the travel_ECU 14 evaluates the distribution of the edge points for each luminance evaluation line, thus extracting the luminance value dispersion area.

Then, in step S106, the travel_ECU 14 sets, as the risk areas Ar, areas including the extracted dispersion areas, and then exits the routine.

Figure 15:
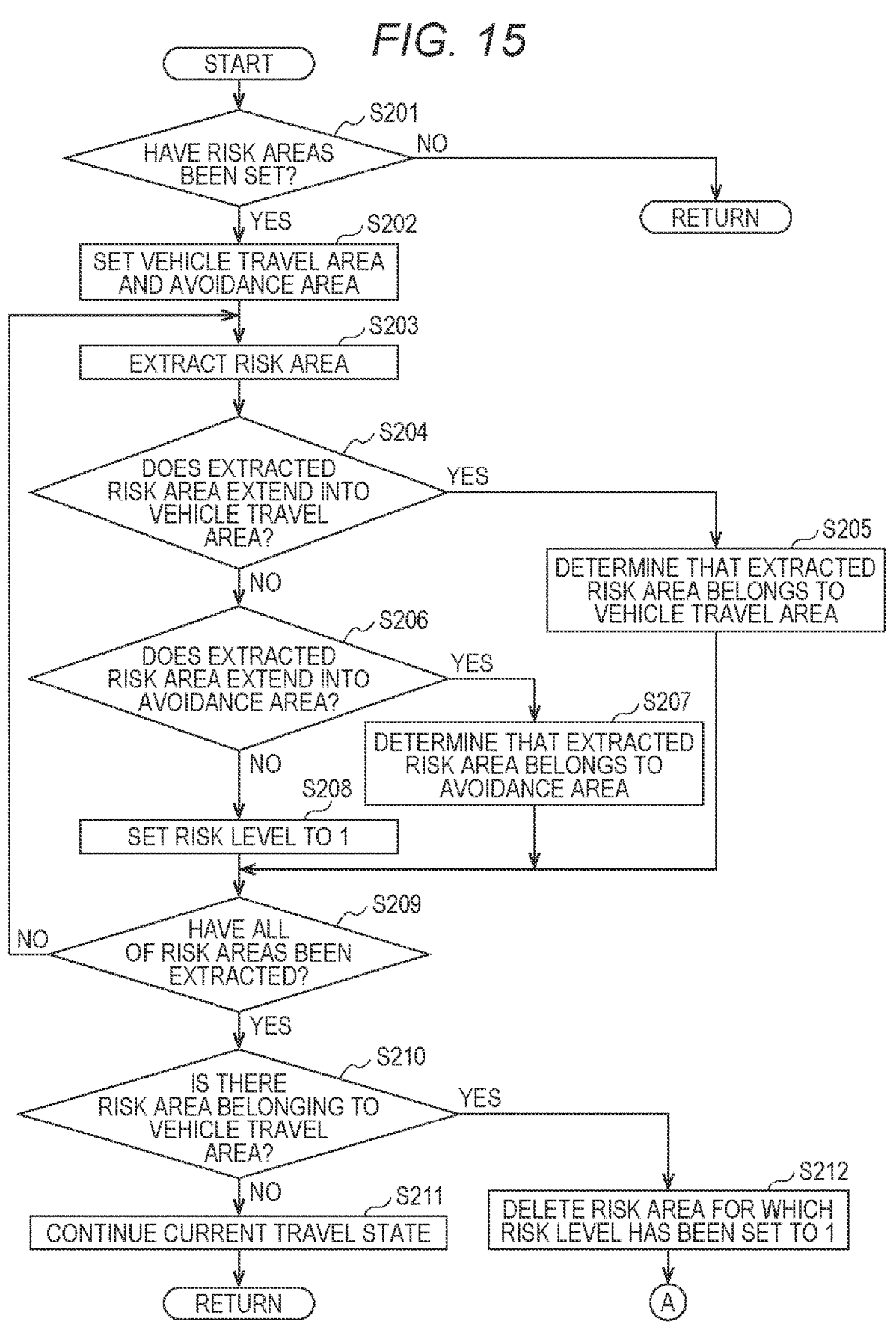
FIG. 15 is a flowchart (part 1) illustrating a risk level setting routine.
Figure 16:
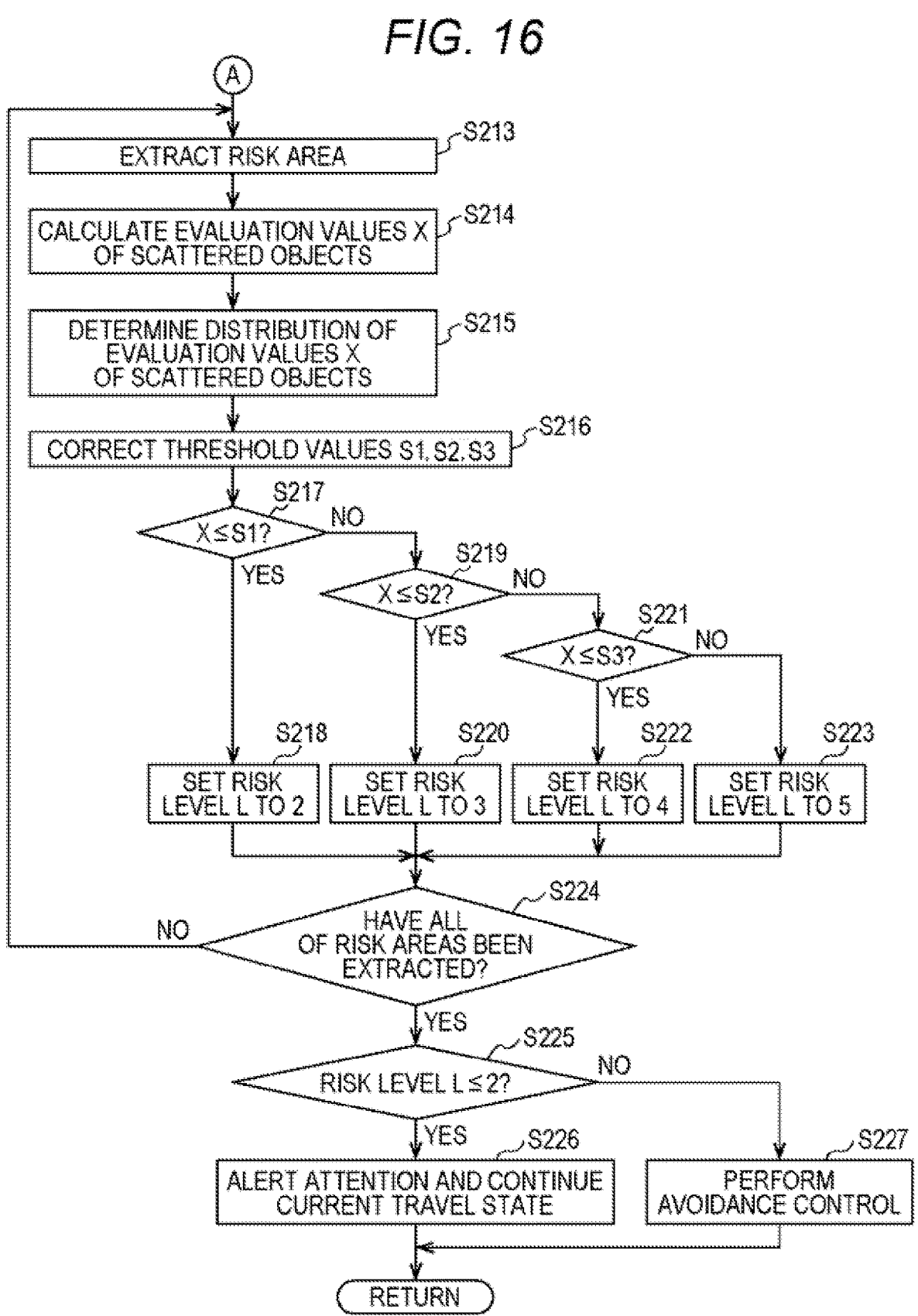
FIG. 16 is a flowchart (part 2) illustrating the risk level setting routine.

Next, the setting of the risk levels for the risk areas Ar will be described with reference to the flowcharts of the risk level setting routine illustrated in FIGS. 15 and 16. This routine is performed by the travel_ECU 14, for example, every time the above-described risk area setting routine ends.

When the routine is started, in step S201, the travel_ECU 14 determines whether the risk areas Ar are set by the risk area setting routine.

Then, when the travel_ECU 14 determines in step S201 that the risk areas Ar have not been set (step S201: NO), the travel_ECU 14 directly exits the routine.

On the other hand, when the travel_ECU 14 determines in step S201 that the risk areas Ar have been set (step S201: YES), the travel_ECU 14 proceeds to step S202.

Figure 7:
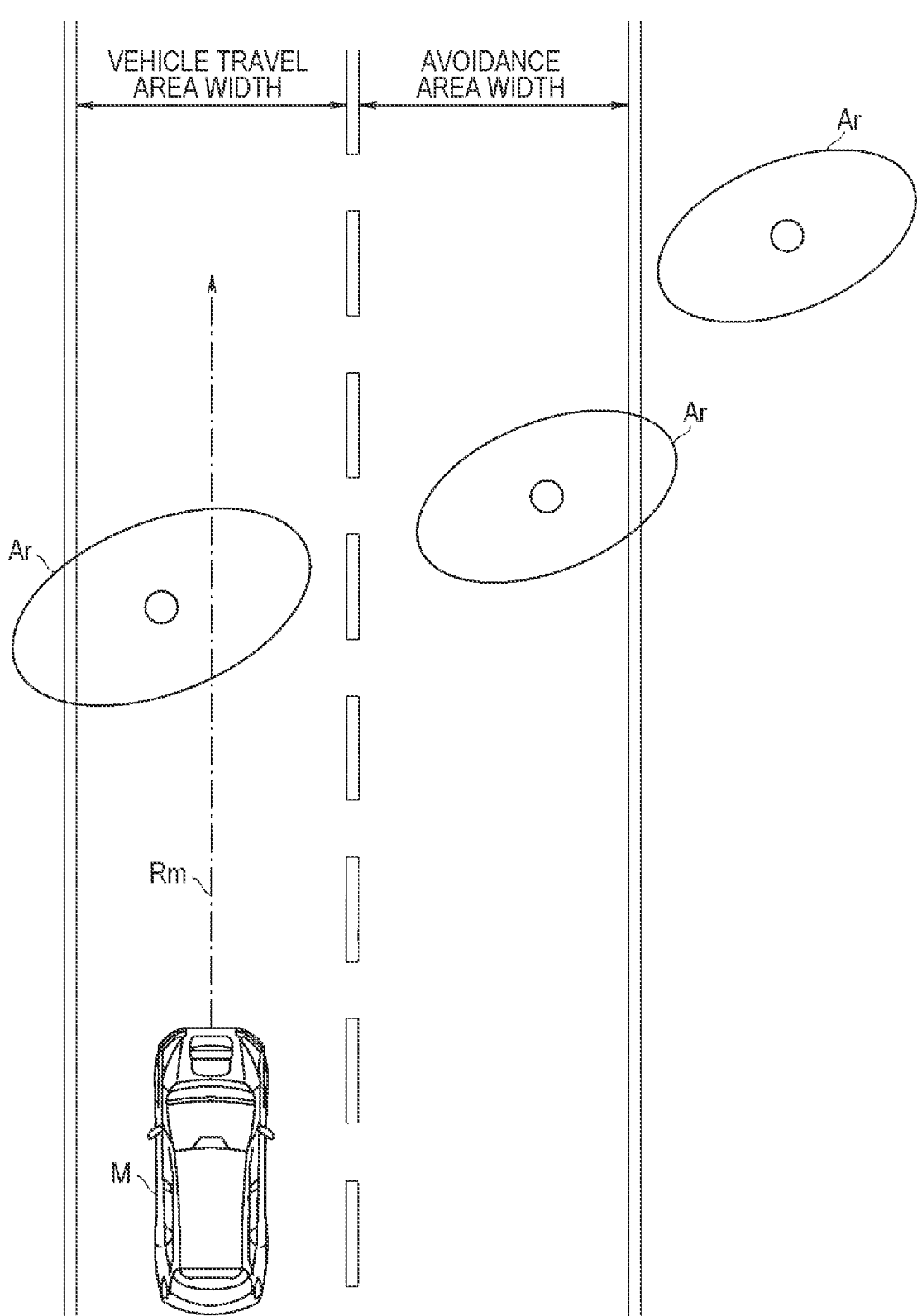
FIG. 7 is a diagram illustrating distribution of risk areas set on the road.

In step S202, the travel_ECU 14 sets a vehicle travel area and an avoidance area. The vehicle travel area set in step S202 is, for example, a travel area set when it is assumed that no risk area Ar is in front of the vehicle M. Thus, for example, as illustrated in FIG. 7, as the vehicle travel area, a vehicle travel lane is set. The vehicle travel lane is a road lane where the target travel path Rm of the vehicle M is set. For example, as the avoidance area, a lane adjacent to the vehicle travel lane is set.

Then, in step S203, the travel_ECU 14 extracts any one of the currently set risk areas Ar.

Then, in step S204, the travel_ECU 14 determines whether the extracted risk area Ar extends into the vehicle travel area.

When the travel_ECU 14 determines in step S204 that at least a part of the extracted risk area Ar extends into the vehicle travel area (step S204: YES), the travel_ECU 14 proceeds to step S205.

In step S205, the travel_ECU 14 determines that the extracted risk area Ar belongs to the vehicle travel area, and then proceeds to step S209.

On the other hand, when the travel_ECU 14 determines in step S204 that the extracted risk area Ar does not extend into the vehicle travel area (step S204: NO), the travel_ECU 14 proceeds to step S206.

In step S206, the travel_ECU 14 determines whether the extracted risk area Ar extends into the avoidance area.

When the travel_ECU 14 determines in step S206 that at least a part of the extracted risk area Ar extends into the avoidance area (step S206: YES), the travel_ECU 14 proceeds to step S207.

In step S207, the travel_ECU 14 determines that the extracted risk area Ar belongs to the avoidance area, and then proceeds to step S209.

On the other hand, when the travel_ECU 14 determines in step S206 that the extracted risk area Ar does not extend into the avoidance area (step S206: NO), the travel_ECU 14 proceeds to step S208.

In step S208, the travel_ECU 14 sets the risk level L for the extracted risk area Ar to "1", and then proceeds to step S209. That is, the risk area Ar that does not extend into either the vehicle travel area or the avoidance area is unlikely to interfere with the vehicle M. Thus, the travel_ECU 14 sets the risk level L for such a risk area Ar to "1".

When the travel_ECU 14 proceeds from step S205, step S207, or step S208 to step S209, the travel_ECU 14 determines whether all of the currently set risk areas Ar have been extracted by the extraction processing in step S203.

When the travel_ECU 14 determines in step S209 that all of the risk areas Ar have not been extracted (step S209: NO), the travel_ECU 14 returns to step S203.

On the other hand, when the travel_ECU 14 determines in step S209 that all of the risk areas Ar have been extracted (step S209: YES), the travel_ECU 14 proceeds to step S210.

In step S210, the travel_ECU 14 determines whether there is a risk area Ar belonging to the vehicle travel area.

When the travel_ECU 14 determines in step S210 that there is no risk area Ar belonging to the vehicle travel area (step S210: NO), the travel_ECU 14 proceeds to step S211.

In step S211, the travel_ECU 14 determines to continue the current travel state, and then exits the routine. That is, when there is no risk area Ar in the vehicle travel area, the vehicle M can travel in the vehicle travel area without being affected by the risk area Ar. Thus, the travel_ECU 14 continues the current travel state.

On the other hand, in step S210, when the travel_ECU 14 determines that there is the risk area Ar belonging to the vehicle travel area (step S210: YES), the travel_ECU 14 proceeds to step S212.

In step S212, when a risk area Ar for which the risk level L has been set to "1" exists, the travel_ECU 14 deletes such a risk area Ar, and then proceeds to step S213. That is, the travel_ECU 14 excludes the risk area Ar for which the risk level L has been set to "1" from the processing targets in step S213 and subsequent steps.

In steps S213 to S224, the travel_ECU 14 sets the risk levels L for the risk areas Ar that have not been deleted (the risk areas Ar, for each of which the risk level L has not been set to "1" in step S208 described above).

Thus, in step S213, the travel_ECU 14 extracts any one of the remaining risk areas Ar that have not been deleted.

Then, in step S214, the travel_ECU 14 calculates an evaluation value X of the scattered objects in the extracted risk area Ar. That is, for example, the travel_ECU 14 calculates, for each small area As within the risk area Ar, the entropy E of the height information items, the maximum value H of the height information items, and the change amounts I of the height information items. Then, the travel_ECU 14 calculates the evaluation value X of the scattered objects for each small area As based on the calculated entropy E of the height information items, maximum value H of the height information items, and change amounts I of the height information items.

Then, in step S215, the travel_ECU 14 determines the calculated evaluation value X of the scattered objects for each small area As. That is, the travel_ECU 14 determines, among the small areas As within the risk area Ar, whether there is a small area As having an evaluation value X greater than the evaluation value X of the small area As located on the inner peripheral side. When there is a small area As having an evaluation value X greater than the evaluation value X of the small area As on the inner peripheral side, the evaluation value X of the small area As on the inner peripheral side is corrected to a value equal to or greater than the evaluation value X of the small area As on the outer peripheral side.

Then, in step S216, the travel_ECU 14 corrects threshold values S1, S2, and S3 set in advance. That is, the travel_ECU 14 corrects the threshold values S1, S2, and S3 based on, for example, the vehicle speed V, the recognition accuracy of each object within the risk area Ar, and the like.

Then, in steps S217 to S223, the travel_ECU 14 sets the risk levels L. Note that, although details are omitted in FIG. 16, when the small areas As are set in the risk area Ar, the processing of setting the risk levels L in steps S217 to S223 is repeatedly performed for each of the evaluation values X of the small areas As.

In step S217, the travel_ECU 14 determines whether the evaluation value X of the small area As is equal to or less than the threshold value S1.

When the travel_ECU 14 determines in step S217 that the evaluation value X is equal to or less than the threshold value S1 (step S217: YES), the travel_ECU 14 proceeds to step S218.

In step S218, the travel_ECU 14 sets the risk level L for the small area As to "2", and then proceeds to step S224.

On the other hand, when the travel_ECU 14 determines in step S217 that the evaluation value X is greater than the threshold value S1 (step S217: NO), the travel_ECU 14 proceeds to step S219.

In step S219, the travel_ECU 14 determines whether the evaluation value X is equal to or less than the threshold value S2.

When the travel_ECU 14 determines in step S219 that the evaluation value X is equal to or less than the threshold value S2 (step S219: YES), the travel_ECU 14 proceeds to step S220.

In step S220, the travel_ECU 14 sets the risk level L for the small area As to "3", and then proceeds to step S224.

On the other hand, when the travel_ECU 14 determines in step S219 that the evaluation value X is greater than the threshold value S2 (step S219: NO), the travel_ECU 14 proceeds to step S221.

In step S221, the travel_ECU 14 determines whether the evaluation value X is equal to or less than the threshold value S3.

When the travel_ECU 14 determines in step S221 that the evaluation value X is equal to or less than the threshold value S3 (step S221: YES), the travel_ECU 14 proceeds to step S222.

In step S222, the travel_ECU 14 sets the risk level L for the small area As to "4", and then proceeds to step S224.

On the other hand, when the travel_ECU 14 determines in step S221 that the evaluation value X is greater than the threshold value S3 (step S221: NO), the travel_ECU 14 proceeds to step S223.

In step S223, the travel_ECU 14 sets the risk level L for the small area As to "5", and then proceeds to step S224.

When the travel_ECU 14 proceeds from step S218, step S220, step S222, and step S223 to step S224, the travel_ECU 14 determines whether all of the remaining risk areas Ar have been extracted by the extraction processing in step S213.

When the travel_ECU 14 determines in step S224 that all of the risk areas Ar have not been extracted (step S224: NO), the travel_ECU 14 returns to step S213.

On the other hand, when the travel_ECU 14 determines in step S224 that all of the risk areas Ar have been extracted (step S224: YES), the travel_ECU 14 proceeds to step S225.

In step S225, the travel_ECU 14 determines whether the maximum value of the risk levels L is equal to or less than "2" among the risk levels L set in the respective risk areas Ar (respective small areas As).

When the travel_ECU 14 determines in step S225 that the maximum value of the risk levels L is equal to or less than "2" (step S225: YES), the travel_ECU 14 proceeds to step S226.

Then, in step S226, the travel_ECU 14 determines to continue the current travel state while alerting the driver, and then exits the routine.

On the other hand, when the travel_ECU 14 determines in step S225 that the maximum value of the risk levels L is greater than "2" (step S225: NO), the travel_ECU 14 proceeds to step S227.

Then, in step S227, the travel_ECU 14 determines to perform avoidance control intended for the risk area Ar, and then exits the routine.

Figure 17:
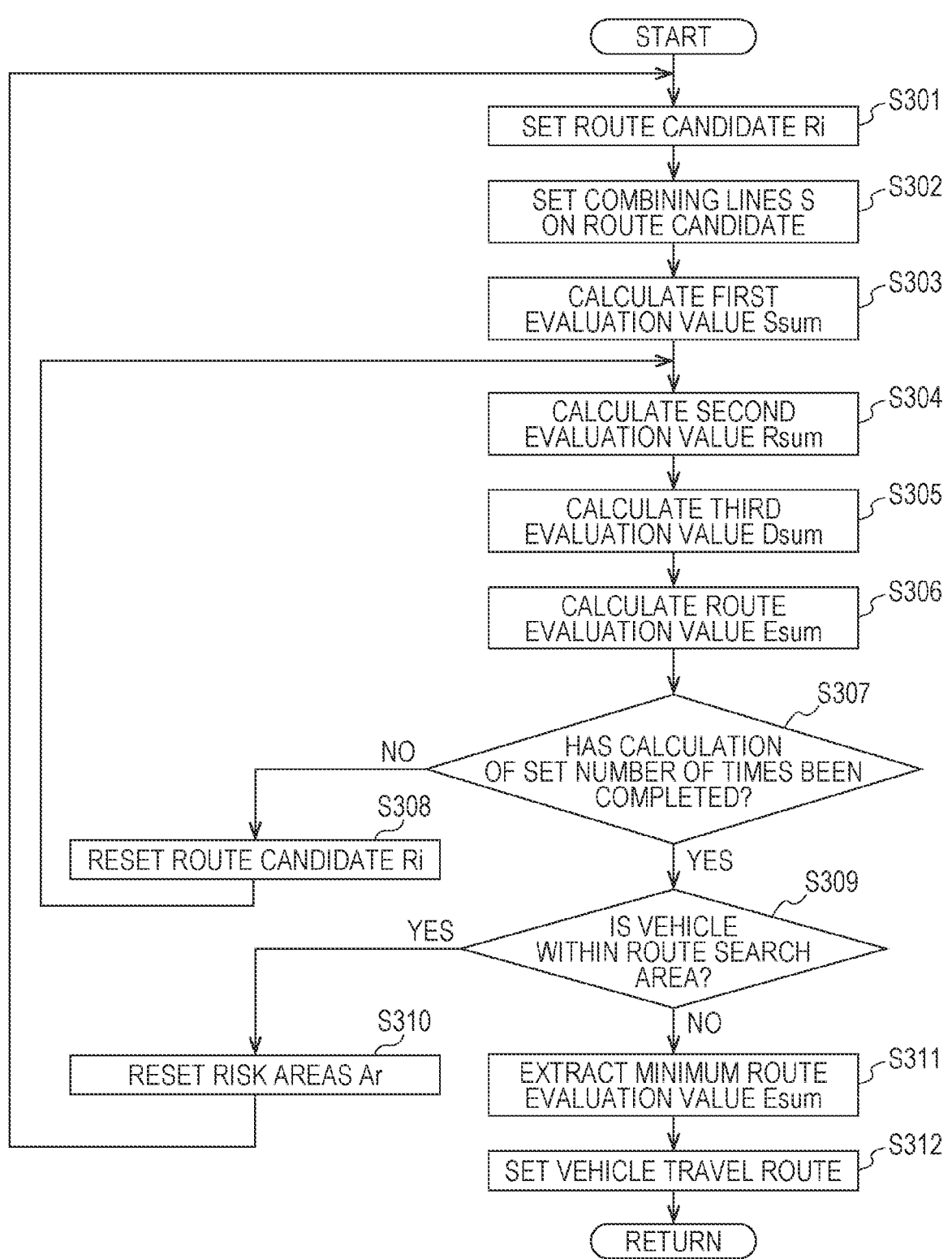
FIG. 17 is a flowchart illustrating a vehicle travel route setting routine.

Next, the setting of the vehicle travel route for avoiding the risk area will be described with reference to a flowchart of a vehicle travel route setting routine illustrated in FIG. 17. For example, this routine is performed by the travel_ECU 14, provided that the travel_ECU 14 determines that the avoidance control is to be performed in the above-described risk level setting routine. Furthermore, this routine is performed, provided that the vehicle M is traveling in the route search area set in the above-described risk area setting routine.

When the routine is started, in step S301, the travel_ECU 14 sets a route candidate Ri for the vehicle M. The route candidate Ri set in step S301 is a route candidate first set for the currently set risk areas Ar. In this case, for example, the travel_ECU 14 sets, as the route candidate Ri, the target travel path Rm along the left and right lane lines of the vehicle M without any changes.

Then, in step S302, the travel_ECU 14 sets the combining lines S on the route candidate Ri. In setting the combining lines S on the route candidate Ri, for example, the travel_ECU 14 sets shortest straight lines coupling the risk areas Ar. Then, for example, the travel_ECU 14 sets, as the combining lines S, the shortest straight lines intersecting the route candidate Ri among the set shortest straight lines.

Then, in step S303, the travel_ECU 14 calculates a first evaluation value Ssum. That is, the travel_ECU 14 calculates, as the first evaluation value Ssum, the total line length of the combining lines S set in step S302.

Then, in step S304, the travel_ECU 14 calculates a second evaluation value Rsum. That is, the travel_ECU 14 estimates the orientation of the vehicle M for each evaluation point xi on the route candidate Ri, and calculates the second evaluation value Rsum based on the positional relationship among each wheel of the vehicle M, each risk area Ar, and each combining line S.

Then, in step S305, the travel_ECU 14 calculates a third evaluation value Dsum. That is, the travel_ECU 14 calculates the third evaluation value Dsum based on the slope of the route candidate Ri at each evaluation point xi.

Then, in step S306, the travel_ECU 14 calculates a route evaluation value Esum. That is, the travel_ECU 14 calculates the route evaluation value Esum based on the first evaluation value Ssum, the second evaluation value Rsum, and the third evaluation value Dsum.

Then, in step S307, the travel_ECU 14 determines whether the route evaluation value Esum has been calculated a set number of times for the currently set risk areas Ar. That is, the travel_ECU 14 determines whether the route evaluation value Esum has been calculated for each route candidate Ri in a state where the route candidate Ri has been changed a set number of times for the currently set risk areas Ar.

Then, when the travel_ECU 14 determines in step S307 that the calculation of the route evaluation value Esum has not been completed the set number of times (step S307: NO), the travel_ECU 14 proceeds to step S308.

In step S308, the travel_ECU 14 resets the route candidate Ri by applying a predetermined correction to the currently set route candidate Ri, and then returns to step S304.

On the other hand, when the travel_ECU 14 determines in step S307 that the calculation of the route evaluation value Esum has been completed the set number of times (step S307: YES), the travel_ECU 14 proceeds to step S309.

In step S309, the travel_ECU 14 determines whether the current vehicle M is within the route search area.

When the travel_ECU 14 determines in step S309 that the vehicle M is within the route search area (step S309: YES), the travel_ECU 14 proceeds to step S310.

In step S310, the travel_ECU 14 resets the risk areas Ar by applying a predetermined correction to the currently set risk areas Ar, and then returns to step S301. In the resetting of the risk areas Ar, for example, the travel_ECU 14 can reduce sizes of the risk areas Ar while maintaining the outer shell shapes of the risk areas Ar.

On the other hand, when the travel_ECU 14 determines in step S309 that the vehicle M has left the route search area (step S309: NO), the travel_ECU 14 proceeds to step S311.

In step S311, the travel_ECU 14 extracts, as the optimum route evaluation value Esum, the minimum route evaluation value Esum from among the route evaluation values Esum calculated based on the patterns of route candidates Ri.

Then, in step S312, the travel_ECU 14 sets, as the vehicle travel route, the route candidate Ri corresponding to the minimum route evaluation value Esum, and exits the routine.

When the vehicle travel route is set, the travel_ECU 14 performs travel control along the vehicle travel route as interruption control of the drive assist control for the vehicle M.

According to the above-described embodiment, the drive assist apparatus 1 causes the image recognition_ECU 13 to recognize an object in front of the vehicle M, and causes the travel_ECU 14 to extract a dispersion area where luminance values are dispersed around the object in front of the vehicle M, and to set, as the risk area Ar where small objects are distributed, an area including the dispersion area. This enables setting of an appropriate risk area Ar for achieving the drive assist control at a higher level.

That is, the travel_ECU 14 extracts an object (central object) from which scattering of the small objects originates, and extracts a dispersion area where luminance values are dispersed around the central object, thus making it possible to appropriately extract an area where the tiny objects that are not recognized by the image recognition_ECU 13 are scattered. Then, the travel_ECU 14 sets, as a single risk area Ar where the small objects are distributed, an area including the luminance value dispersion area, thus making it possible to set an appropriate risk area Ar for the scattered objects or the like. For example, the risk area Ar for the scattered objects or the like is not individually set for each scattered object, but a single area is set for a group of scattered objects. Thus, an appropriate risk area Ar can be set without applying an excessive calculation load to the travel_ECU 14.

In this case, the travel_ECU 14 evaluates the change in the luminance values for each radial direction along the road surface with the central object as the center, and extracts, as the luminance value dispersion area, a range where the points at which the luminance values change, the number of which is equal to or greater than a threshold value are distributed. Thus, the luminance value dispersion area can be accurately extracted by simple arithmetic processing.

Moreover, the travel_ECU 14 sets a risk area Ar with an ellipse circumscribing the dispersion area as a contour. This can prevent the risk area Ar from being set in an excessively wide range.

Furthermore, the drive assist apparatus 1 of the present embodiment causes the image recognition_ECU 13 to recognize an object in front of the vehicle M, and causes, when small objects are around the object, the travel_ECU 14 to set a risk area Ar including the small objects, and to set the risk level L for the risk area Ar with respect to the vehicle M based on the distribution of the height information items within the risk area Ar. This can achieve appropriate drive assist control for the scattered objects on the road.

That is, the travel_ECU 14 estimates the influence of each scattered object on the vehicle M based on the height information item of each scattered object, thus making it possible to individually evaluate the risk level L for each risk area Ar.

In this case, the travel_ECU 14 calculates, based on the height of the road surface, the entropy E of the height information items within the risk area Ar, and sets the risk level L to be higher as the entropy E of the height information items is greater. This enables the setting of an appropriate risk level L in accordance with the state of the scattered objects or the like within each risk area Ar.

The travel_ECU 14 extracts the maximum value H of the height information items within the risk area Ar, and sets the risk level L to be higher as the maximum value H of the height information items is greater. This enables the setting of an appropriate risk level L in accordance with the state of the scattered objects or the like within each risk area Ar.

The travel_ECU 14 calculates the change amounts I in the height information items within the risk area Ar, and sets the risk level L to be higher as the change amounts I in the height information items are smaller. This enables the setting of an appropriate risk level L in accordance with the attribute (material, mass, or the like) of each of the scattered objects.

Furthermore, the travel_ECU 14 divides the risk area Ar into small areas As, and sets the risk level L for each of the divided small areas As. This enables the setting of an appropriate risk level L reflecting, for example, the state where the objects are scattered.

Furthermore, the drive assist apparatus 1 of the present embodiment causes the image recognition_ECU 13 to recognize an object in front of the vehicle M, and causes, when small objects are around the object, the travel_ECU 14 to set a risk area Ar including the small objects, to set a risk level L for the risk area Ar based on a state where the small objects are distributed within the risk area Ar, to set patterns of route candidates Ri for avoiding a risk resulting from the risk area Ar, to calculate a route evaluation value Esum for each of the route candidates Ri, and to set, as a vehicle travel route (avoidance route), a route candidate Ri for which the route evaluation value Esum is optimized. In calculating the route evaluation value Esum, the travel_ECU 14 calculates, for each set distance x, the position of the vehicle M moving along the route candidate Ri, and decreases the route evaluation value Esum in accordance with the risk level L for the risk area Ar every time the vehicle M is at the position passing through the risk area Ar. Even when there are many risk areas Ar on the road, this can formulate an optimum avoidance route for each risk area Ar.

That is, the route evaluation value Esum is decreased in accordance with the risk level L for the risk area Ar every time the vehicle M is at a position passing through the risk area Ar, thus making it possible to set an avoidance route appropriately reflecting the risk level L for each risk area Ar.

In this case, when there are many risk areas Ar, the travel_ECU 14 sets shortest straight lines coupling the risk areas Ar, and increases the route evaluation value Esum every time the vehicle M is at a position passing through the shortest straight lines. Thus, the evaluation value (route evaluation value Esum) for the route candidate Ri that can avoid the interference of the vehicle M with the two risk areas Ar can be calculated to be high between the two risk areas Ar.

In addition, the travel_ECU 14 calculates the slope for each set distance x for the route candidate Ri, and decreases the route evaluation value Esum as the sum of the slopes at the respective set distances x is greater. This can calculate the route evaluation value Esum to be relatively low for the route candidate Ri whose steering amount is larger, as compared with the route candidate Ri whose steering amount is smaller, and enable the setting of an appropriate vehicle travel route (avoidance route) in consideration of the ride comfort of an occupant.

Here, in the above-described embodiment, the image recognition_ECU 13, the travel_ECU 14, the CP_ECU 21, the E/G_ECU 22, the T/M_ECU 23, the BK_ECU 24, the PS_ECU 25, and the like are implemented by a known microcomputer including a CPU, a RAM, a ROM, a non-volatile storage unit, and the like, and peripheral devices thereof. The ROM stores in advance a program performed by the CPU, fixed data such as a data table, and the like. All or some functions of the processor may be constituted by a logic circuit or an analog circuit, and various programs may be processed by an electronic circuit such as a field-programmable gate array (FPGA).

The disclosure described in the embodiment is not limited to the embodiment and various modifications may be made without departing from the scope of the disclosure in the implementation phase. Furthermore, the embodiment described above includes various stages of the disclosure, and various disclosures may be made by appropriately combining constituent elements disclosed herein.

For example, even if some constituent elements described in the embodiment are removed, the resulting components, with the constituent elements removed, can still constitute the disclosure, as long as the problems described above can be solved and the effects described above can be achieved.

The invention claimed is:

1. A vehicle drive assist apparatus to be applied to a vehicle, the vehicle drive assist apparatus comprising:
one or more processors; and
one or more memories storing instructions causing the one or more processors to:
receive an environment image transmitted from a camera;
generate distance image information based on the received environment image;
recognize an object in front of the vehicle based on the generated distance image information;
extract, as a dispersion area, a range where a number of points at which luminance values dispersed around the recognized object change, from the generated distance image information, the number of points being equal to or greater than a threshold value;
set a risk area where small objects are distributed based on the generated distance image information, the risk area including the dispersion area and being set based on a position of the recognized object, the small objects being smaller than the recognized object and distributed around the recognized object; and
cause the vehicle to travel along a vehicle travel route that avoids the set risk area.

2. The vehicle drive assist apparatus according to claim 1, wherein the one or more processors are further caused to evaluate a change in the luminance values for each of radial directions along a road surface with the object as a center.

3. The vehicle drive assist apparatus according to claim 2, wherein the one or more processors are further caused to set the risk area having an ellipse circumscribing the dispersion area as a contour.

4. The vehicle drive assist apparatus according to claim 1, wherein the one or more processors are further caused to:
set a risk level for the risk area based on a distribution state of the small objects within the risk area.

5. The vehicle drive assist apparatus according to claim 4, wherein the risk level is set based on a distribution of height information of the small objects within the risk area.

6. The vehicle drive assist apparatus according to claim 1, wherein the small objects are scattered objects resulting from the recognized object.

7. A vehicle drive assist apparatus to be applied to a vehicle, the vehicle drive assist apparatus comprising:
a component comprising a camera; and
circuitry configured to
receive an environment image transmitted from the camera;
generate distance image information based on the received environment image;
recognize, together with the component, an object in front of the vehicle based on the generated distance image information,
extract, as a dispersion area, a range where a number of points at which luminance values dispersed around the recognized object change, from the generated distance image information, the number of points being equal to or greater than a threshold value,
set a risk area where small objects are distributed based on the generated distance image information, the risk area including the dispersion area and being set based on a position of the recognized object, the small objects being smaller than the recognized object and distributed around the recognized object, and
cause the vehicle to travel along a vehicle travel route that avoids the set risk area.

8. The vehicle drive assist apparatus according to claim 7, wherein the circuitry is configured to evaluate a change in the luminance values for each of radial directions along a road surface with the object as a center.

9. The vehicle drive assist apparatus according to claim 8, wherein the circuitry is configured to set the risk area having an ellipse circumscribing the dispersion area as a contour.

10. The vehicle drive assist apparatus according to claim 7, wherein the circuitry is configured to:
set a risk level for the risk area based on a distribution state of the small objects within the risk area.

11. The vehicle drive assist apparatus according to claim 10, wherein the risk level is set based on a distribution of height information of the small objects within the risk area.

12. The vehicle drive assist apparatus according to claim 7, wherein the small objects are scattered objects resulting from the recognized object.

* * * * *